US012572407B2

(12) United States Patent
Gonzalez et al.

(10) Patent No.: US 12,572,407 B2
(45) Date of Patent: Mar. 10, 2026

(54) MULTI-INSTANCE GENERIC OPERATION PIPELINE

(71) Applicant: CrowdStrike, Inc., Sunnyvale, CA (US)

(72) Inventors: Raul Gonzalez, Glenview, IL (US); Marielle Sorum Foster Wonder, Berlin (DE); Tobin Yehle, Salt Lake City, UT (US)

(73) Assignee: CrowdStrike, Inc., Sunnyvale, CA (US)

( * ) Notice: Subject to any disclaimer, the term of this patent is extended or adjusted under 35 U.S.C. 154(b) by 36 days.

(21) Appl. No.: 18/633,740

(22) Filed: Apr. 12, 2024

(65) Prior Publication Data

US 2025/0321821 A1 Oct. 16, 2025

(51) Int. Cl.
G06F 11/00 (2006.01)
G06F 11/07 (2006.01)
G06F 11/34 (2006.01)
G06F 21/55 (2013.01)

(52) U.S. Cl.
CPC ...... G06F 11/0784 (2013.01); G06F 11/0793 (2013.01); G06F 11/3409 (2013.01); G06F 21/554 (2013.01)

(58) Field of Classification Search
CPC ............. G06F 11/0784; G06F 11/0793; G06F 11/3409; G06F 21/554
See application file for complete search history.

(56) References Cited

U.S. PATENT DOCUMENTS

| | | | |
|---|---|---|---|
| 7,200,866 B2 | 4/2007 | Kim et al. | |
| 11,178,168 B1 | 11/2021 | Lin et al. | |
| 2004/0049693 A1 | 3/2004 | Douglas | |
| 2008/0114886 A1 | 5/2008 | Kulkarni et al. | |
| 2019/0028550 A1 | 1/2019 | Bowden | |
| 2023/0281109 A1* | 9/2023 | Taber ................... | G06F 11/3698 |
| | | | 717/124 |
| 2023/0281342 A1* | 9/2023 | Taber .................... | G06F 11/366 |
| | | | 726/28 |
| 2024/0028713 A1* | 1/2024 | Dhoble ................. | G06F 21/554 |
| 2024/0152371 A1* | 5/2024 | He ....................... | G06F 9/45558 |
| 2024/0354407 A1* | 10/2024 | Braggs .................... | H04L 63/14 |

FOREIGN PATENT DOCUMENTS

WO 2023196221 4/2023

* cited by examiner

*Primary Examiner* — Joshua P Lottich
(74) *Attorney, Agent, or Firm* — Law Office of Scott P. Zimmerman, PLLC

(57) ABSTRACT

An event detection service detects hardware and software events at endpoint devices. The event detection service deploys templates to agents in the field. Each template is created in the cloud to describe kernel-mode and user-mode events of interest. Each agent installs the templates without rebooting. Each agent monitors its host's event behaviors according to the templates. If the host's event behaviors satisfy the template, then the agent has a Multi-Instance Generic Operation pipeline that determines a template disposition specified by the template. The agent may thus dynamically detect event behaviors for a purpose, as specified by the template.

20 Claims, 50 Drawing Sheets

Figure 3:
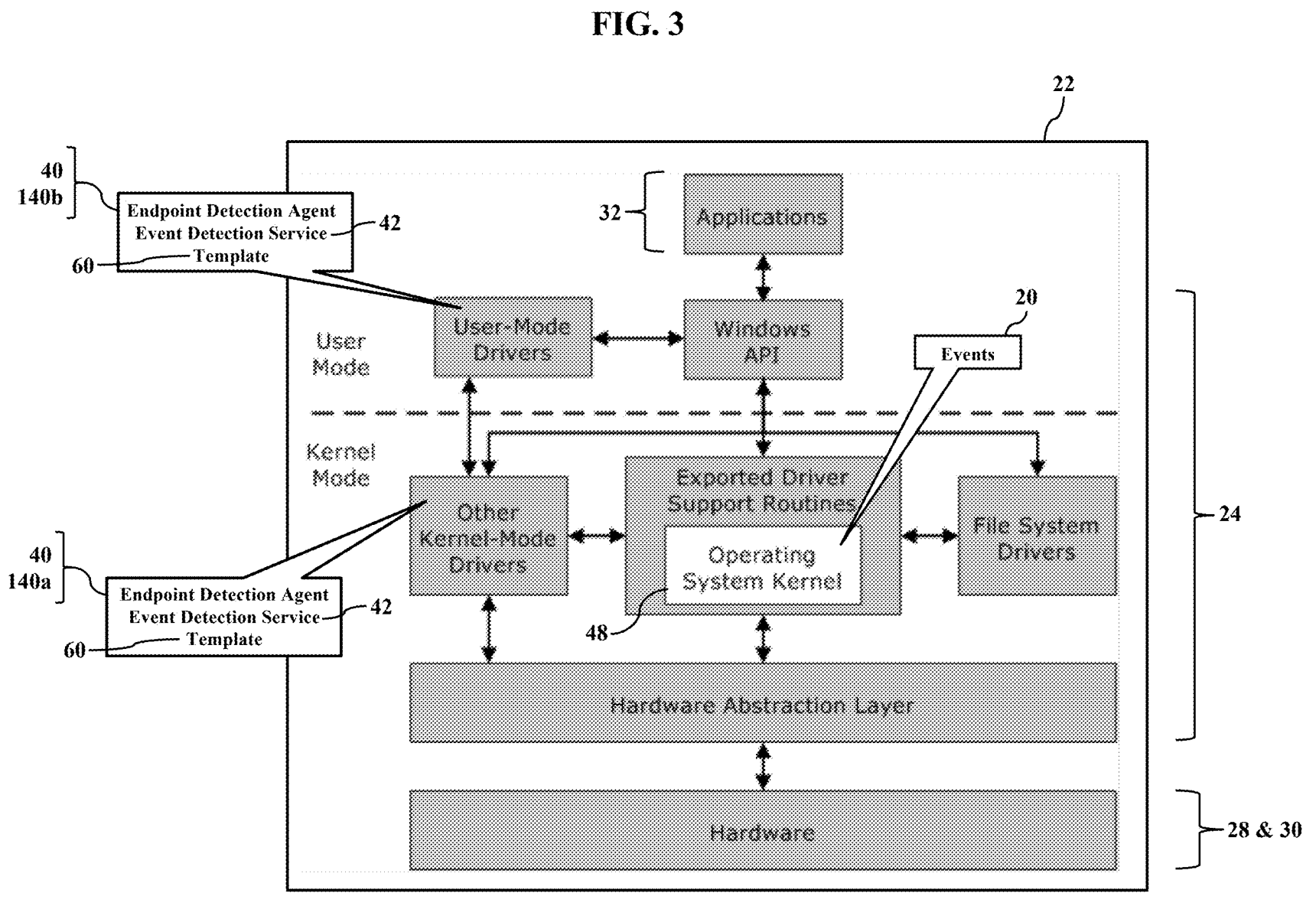

20 — Events

Applications

Windows API

Exported Driver Support Routines

Operating System Kernel

File System Drivers

Hardware Abstraction Layer

Hardware

User Mode Drivers

Other Kernel Mode Drivers

User Mode

Kernel Mode

32

48

42 — Endpoint Detection Agent — Event Detection Service — Template

60

40
140b

42 — Endpoint Detection Agent — Event Detection Service — Template

60

40
140a

FIG. 5
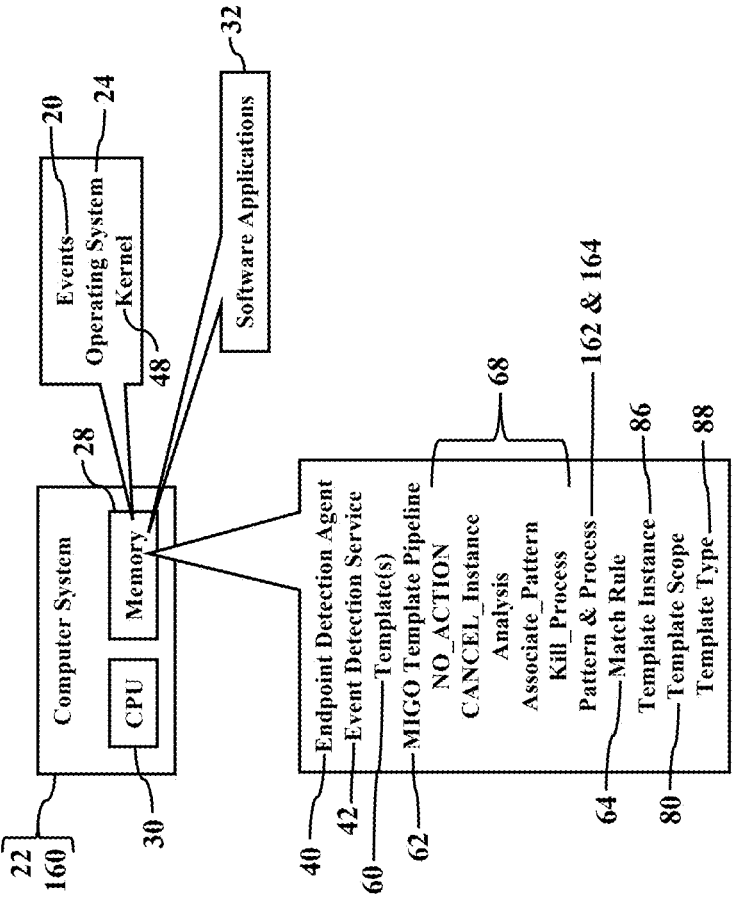

Figure 9:
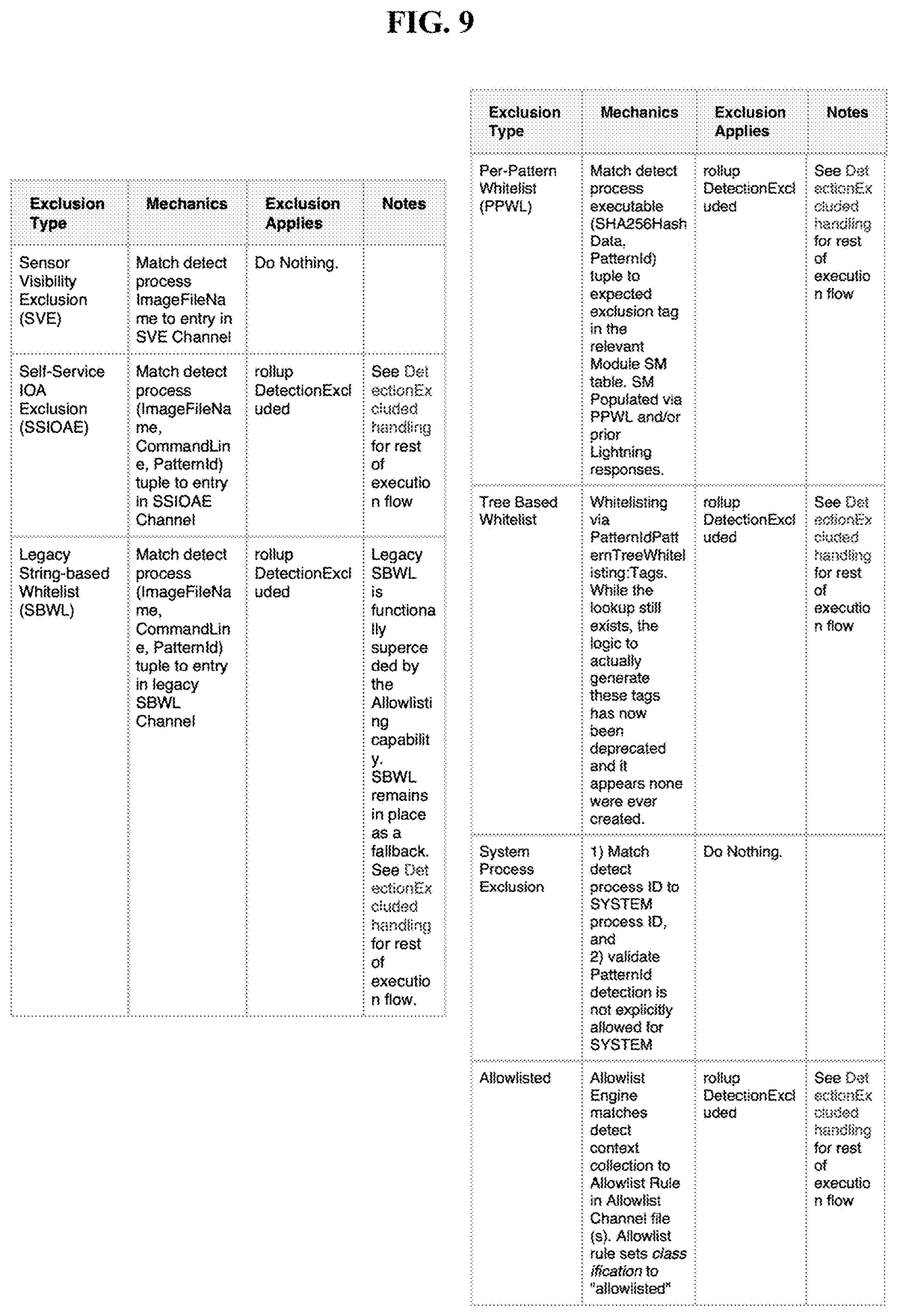

| Exclusion Type | Mechanics | Exclusion Applies | Notes |
|---|---|---|---|
| Sensor Visibility Exclusion (SVE) | Match detect process ImageFileName to entry in SVE Channel | Do Nothing. | |
| Self-Service IOA Exclusion (SSIOAE) | Match detect process (ImageFileName, CommandLine, PatternId) tuple to entry in SSIOAE Channel | rollup DetectionExcl uded | See Det ectionEx cluded handling for rest of executio n flow |
| Legacy String-based Whitelist (SBWL) | Match detect process (ImageFileName, CommandLine, PatternId) tuple to entry in legacy SBWL Channel | rollup DetectionExcl uded | Legacy SBWL is functiona lly superce ded by the Allowlisti ng capabilit y. SBWL remains in place as a fallback. See Det ectionEx cluded handling for rest of executio n flow. |

| Exclusion Type | Mechanics | Exclusion Applies | Notes |
|---|---|---|---|
| Per-Pattern Whitelist (PPWL) | Match detect process executable (SHA256Hash Data, PatternId) tuple to expected exclusion tag in the relevant Module SM table. SM Populated via PPWL and/or prior Lightning responses. | rollup DetectionExcl uded | See Det ectionEx cluded handling for rest of executio n flow |
| Tree Based Whitelist | Whitelisting via PatternIdPatt ernTreeWhitel isting:Tags. While the lookup still exists, the logic to actually generate these tags has now been deprecated and it appears none were ever created. | rollup DetectionExcl uded | See Det ectionEx cluded handling for rest of executio n flow |
| System Process Exclusion | 1) Match detect process ID to SYSTEM process ID, and 2) validate PatternId detection is not explicitly allowed for SYSTEM | Do Nothing. | |
| Allowlisted | Allowlist Engine matches detect context collection to Allowlist Rule in Allowlist Channel file (s). Allowlist rule sets *class ification* to "allowlisted" | rollup DetectionExcl uded | See Det ectionEx cluded handling for rest of executio n flow |

FIG. 10

| Handling Type | Mechanics | Handling Applies | Notes |
|---|---|---|---|
| Kill Process | Allowlist Engine matches detect context collection to Allowlist Rule in Allowlist Channel file (s). Allowlist rule sets *classification* to "detect" and *action* to "kill process" | rollup LocalKillProcessRequest | Execution handed off to Sensor Remediations, which is a distinct logical component, that *interacts* with the Sensor Detections Pipeline. See Sensor Remediations - Capability - Kill Process for rest of execution flow. |
| Detect | a) Allowlist Engine matches detect context collection to Allowlist Rule in Allowlist Channel file (s). Allowlist rule sets *classification* to "detect", or b) No Allowlist rule matches; "detect" PatternHandling tag set in SM PatternHandlingTags table record for the given PatternId. SM populated by Dynamic Patterns channel and /or Taxonomy-defined default pattern handling. | rollup AssociateTreeId | See AssociateTreeId (WithRoot) handling for rest of execution flow |

| Handling Type | Mechanics | Handling Applies | Notes |
|---|---|---|---|
| Indicator | a) Allowlist Engine matches detect context collection to Allowlist Rule in Allowlist Channel file (s). Allowlist rule sets *class ification* to "indicator", or b) No Allowlist rule matches; "indicator" PatternHandling tag set in SM PatternHandlingTags table record for the given PatternId. SM populated by Dynamic Patterns channel and /or Taxonomy-defined default pattern handling. | rollup AssociateIndicator | See AssociateIndicator handling for rest of execution flow |
| None | default if none of the above scenarios are satisfied. | rollup PatternHandlingError | PatternHandlingError is clouded (and available for cloud analysis) |

FIG. 11

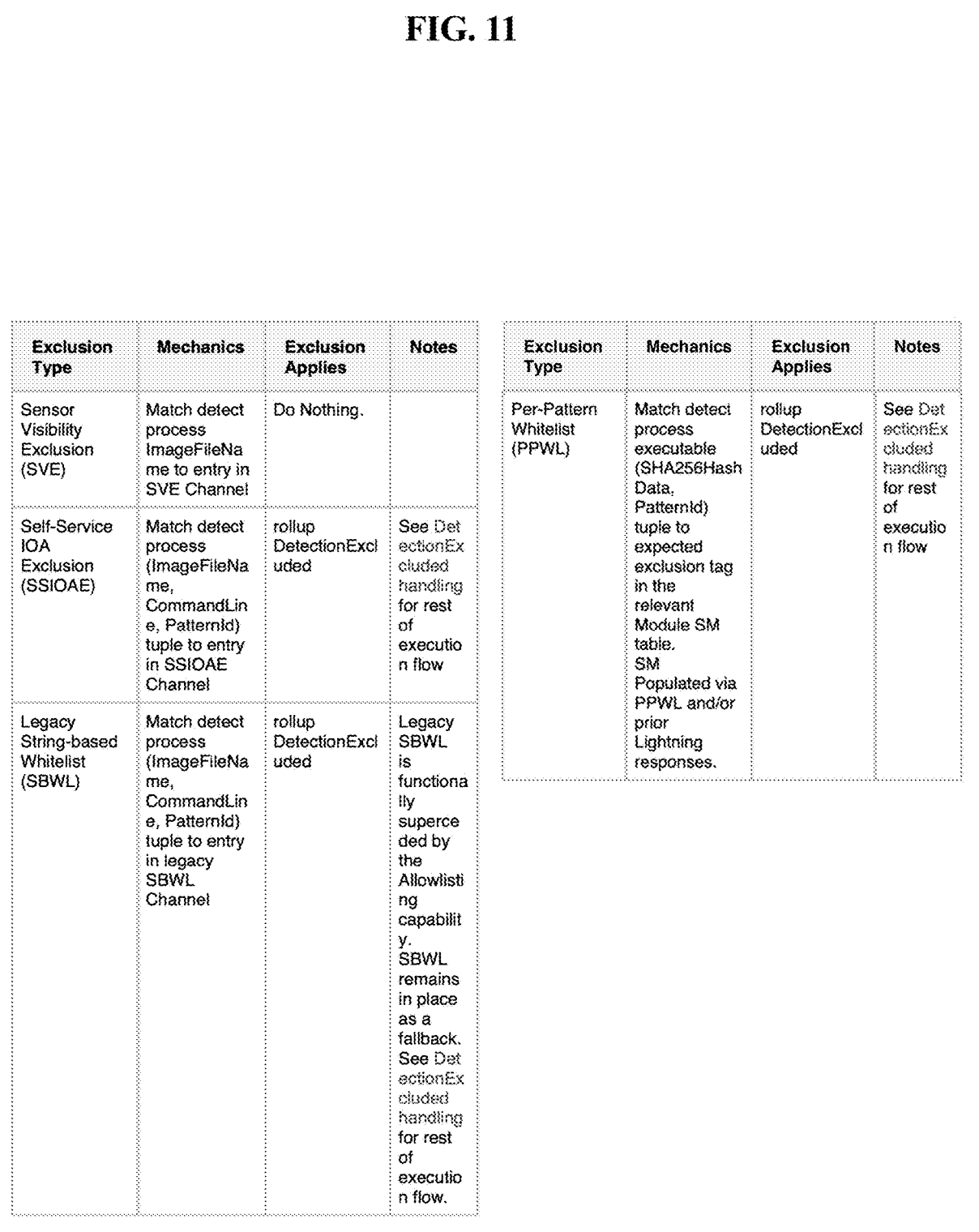

| Exclusion Type | Mechanics | Exclusion Applies | Notes |
|---|---|---|---|
| Sensor Visibility Exclusion (SVE) | Match detect process ImageFileName to entry in SVE Channel | Do Nothing. | |
| Self-Service IOA Exclusion (SSIOAE) | Match detect process (ImageFileName, CommandLine, PatternId) tuple to entry in SSIOAE Channel | rollup DetectionExcl uded | See Det ectionEx cluded handling for rest of executio n flow |
| Legacy String-based Whitelist (SBWL) | Match detect process (ImageFileName, CommandLine, PatternId) tuple to entry in legacy SBWL Channel | rollup DetectionExcl uded | Legacy SBWL is functiona lly superce ded by the Allowlisti ng capabilit y. SBWL remains in place as a fallback. See Det ectionEx cluded handling for rest of executio n flow. |

| Exclusion Type | Mechanics | Exclusion Applies | Notes |
|---|---|---|---|
| Per-Pattern Whitelist (PPWL) | Match detect process executable (SHA256Hash Data, PatternId) tuple to expected exclusion tag in the relevant Module SM table. SM Populated via PPWL and/or prior Lightning responses. | rollup DetectionExcl uded | See Det ectionEx cluded handling for rest of executio n flow |

FIG. 12

| Handling Type | Mechanics | Handling Applies | Notes |
|---|---|---|---|
| Detect | "detect" PatternHandling tag set in SM PatternHandlingTags table record for the given PatternId. SM populated by Dynamic Patterns channel and /or Taxonomy-defined default pattern handling. | rollup AssociateTreeId | See AssociateTreeId (WithRoot) handling for rest of execution flow |
| Indicator | "indicator" PatternHandling tag set in SM PatternHandlingTags table record for the given PatternId. SM populated by Dynamic Patterns channel and /or Taxonomy-defined default pattern handling. | rollup AssociateIndicator | See AssociateIndicator handling for rest of execution flow |
| None | default if none of the above scenarios are satisfied. | rollup PatternHandlingError | PatternHandlingError is clouded (and available for cloud analysis) |

FIG. 13

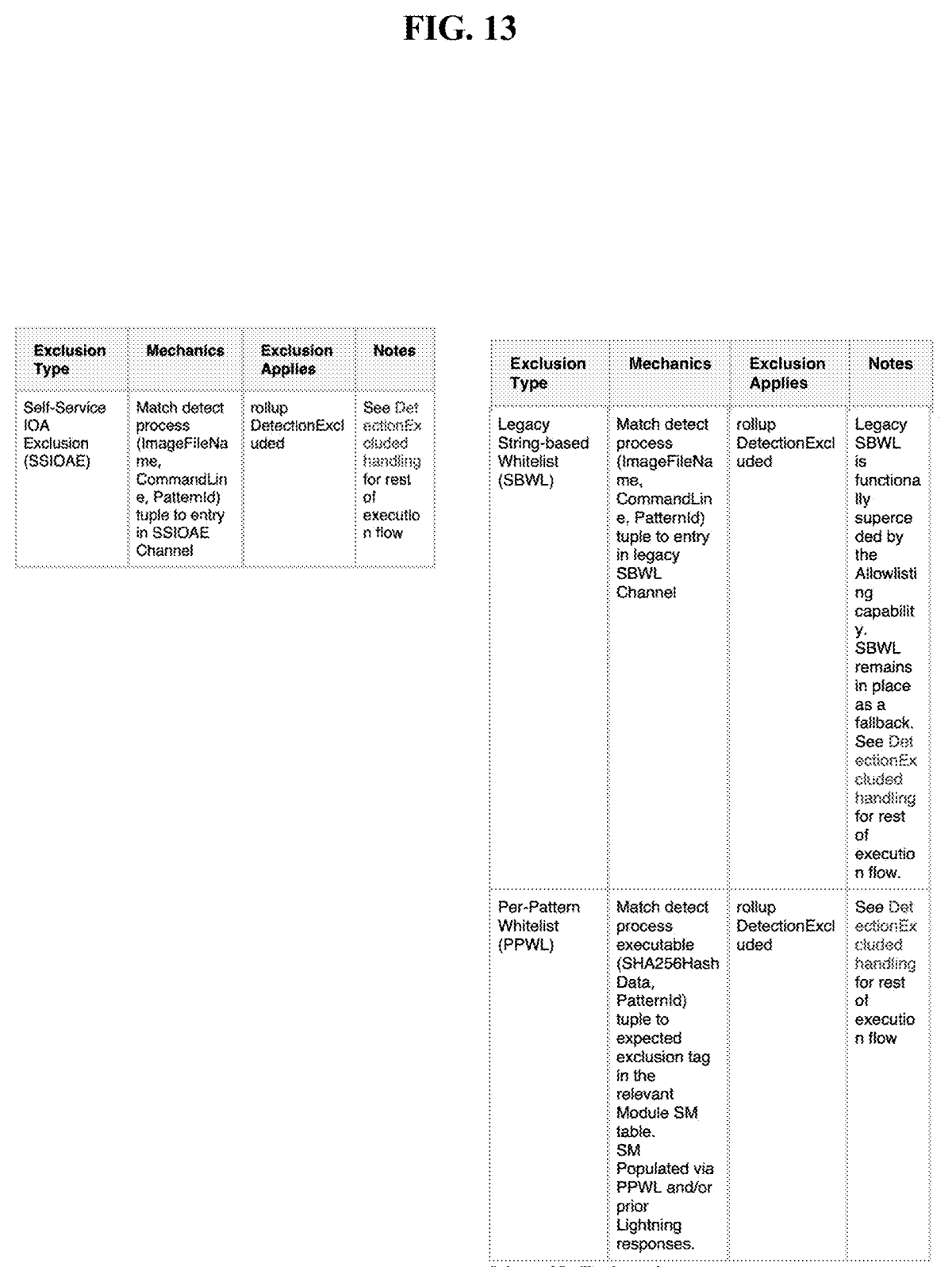

| Exclusion Type | Mechanics | Exclusion Applies | Notes |
|---|---|---|---|
| Self-Service IOA Exclusion (SSIOAE) | Match detect process (ImageFileName, CommandLine, PatternId) tuple to entry in SSIOAE Channel | rollup DetectionExcluded | See DetectionExcluded handling for rest of execution flow |

| Exclusion Type | Mechanics | Exclusion Applies | Notes |
|---|---|---|---|
| Legacy String-based Whitelist (SBWL) | Match detect process (ImageFileName, CommandLine, PatternId) tuple to entry in legacy SBWL Channel | rollup DetectionExcluded | Legacy SBWL is functionally superceded by the Allowlisting capability. SBWL remains in place as a fallback. See DetectionExcluded handling for rest of execution flow. |
| Per-Pattern Whitelist (PPWL) | Match detect process executable (SHA256HashData, PatternId) tuple to expected exclusion tag in the relevant Module SM table. SM Populated via PPWL and/or prior Lightning responses. | rollup DetectionExcluded | See DetectionExcluded handling for rest of execution flow |

FIG. 14

| Handling Type | Mechanics | Handling Applies | Notes | Handling Type | Mechanics | Handling Applies | Notes |
|---|---|---|---|---|---|---|---|
| Detect | "detect" PatternHandling tag set in SM PatternHandlingTags table record for the given PatternId. SM populated by Dynamic Patterns channel and /or Taxonomy-defined default pattern handling. | rollup AssociateTreeId | See Ass ociateTr eeId (WithRo ot) handling for rest of executio n flow | Indicator | "indicator" PatternHandling tag set in SM PatternHandlingTags table record for the given PatternId. SM populated by Dynamic Patterns channel and /or Taxonomy-defined default pattern handling. | rollup AssociateIndicator | See Ass ociateInd icator handling for rest of executio n flow |
| | | | | None | default if none of the above scenarios are satisfied. | rollup PatternHandlingError | PatternHandlingError is clouded (and available for cloud analysis) |

FIG. 15

| Exclusion Type | Mechanics | Exclusion Applies | Notes |
|---|---|---|---|
| Sensor Visibility Exclusion (SVE) | Match detect process ImageFileName to entry in SVE Channel | Do Nothing. | |
| Self-Service IOA Exclusion (SSIOAE) | Match detect process (ImageFileName, CommandLine, PatternId) tuple to entry in SSIOAE Channel | rollup DetectionExcl uded | See Det ectionEx cluded handling for rest of executio n flow |
| Legacy String-based Whitelist (SBWL) | Match detect process (ImageFileName, CommandLine, PatternId) tuple to entry in legacy SBWL Channel | rollup DetectionExcl uded | Legacy SBWL is functiona lly superce ded by the Allowlisti ng capabilit y. SBWL remains in place as a fallback. See Det ectionEx cluded handling for rest of executio n flow. |

| Exclusion Type | Mechanics | Exclusion Applies | Notes |
|---|---|---|---|
| Per-Pattern Whitelist (PPWL) | Match detect process executable (SHA256Hash Data, PatternId) tuple to expected exclusion tag in the relevant Module SM table. SM Populated via PPWL and/or prior Lightning responses. | rollup DetectionExcl uded | See Det ectionEx cluded handling for rest of executio n flow |
| Allowlisted | Allowlist Engine matches detect context collection to Allowlist Rule in Allowlist Channel file (s). Allowlist rule sets *class ification* to "allowlisted" | rollup DetectionExcl uded | See Det ectionEx cluded handling for rest of executio n flow |

FIG. 16

| Exclusion Type | Mechanics | Handling Applies | Notes |
|---|---|---|---|
| Block Process | 1) Relevant response system tag is set, and 2) detect context indicates "block process" action. | rollup PreventPolicyResult | Execution handed off to Sensor Preventions (Process Prevention Pipeline [Historical Documentation]), which is a distinct logical component, that *interacts* with the Sensor Detections Pipeline. See Sensor Preventions - Capability - Block Process Creation for rest of execution flow. |

| Exclusion Type | Mechanics | Handling Applies | Notes |
|---|---|---|---|
| Kill Process | 1) Relevant response system tag is set, and 2a) Allowlist Engine matches detect context collection to Allowlist Rule in Allowlist Channel file(s). Allowlist rule sets *class ification* to "detect" and *a ction* to "kill process", or 2b) No Allowlist rule matches; detect context indicates "kill process" action. | rollup LocalKillProcessRequest | Execution handed off to Sensor Remediations, which is a distinct logical component, that *interacts* with the Sensor Detections Pipeline. See Sensor Remediations - Capability - Kill Process for rest of execution flow. |
| Block UMPPC Operation | 1) Relevant response system tag is set, and 2) detect context indicates "block UMPPC operation" action. | rollup LocalUmppcBlockRequest | Execution handed off to Sensor Preventions, which is a distinct logical component, that *interacts* with the Sensor Detections Pipeline. See Sensor Preventions - Capability - Block UMPPC Operation for rest of execution flow. |
| None | default if none of the above scenarios are satisfied. | rollup IdentifyBehavior | See IdentifyBehavior handling for rest of execution flow |

FIG. 19

| Exclusion Type | Mechanics | Exclusion Applies | Notes |
|---|---|---|---|
| Sensor Visibility Exclusion (SVE) | Match detect process ImageFileName to entry in SVE Channel | Do Nothing. | |
| Self-Service IOA Exclusion (SSIOAE) | Match detect process (ImageFileName, CommandLine, PatternId) tuple to entry in SSIOAE Channel | rollup IdentifyBehavior | See IdentifyBehavior handling for rest of execution flow |
| Legacy String-based Whitelist (SBWL) | Match detect process (ImageFileName, CommandLine, PatternId) tuple to entry in legacy SBWL Channel | rollup IdentifyBehavior | See IdentifyBehavior handling for rest of execution flow |
| Per-Pattern Whitelist (PPWL) | Match detect process executable (SHA256HashData, PatternId) tuple to expected exclusion tag in the relevant Module SM table. SM Populated via PPWL and/or prior Lightning responses. | rollup IdentifyBehavior | See IdentifyBehavior handling for rest of execution flow |

FIG. 20

| Exclusion Type | Mechanics | Handling Applies | Notes |
|---|---|---|---|
| Block Process | 1) Relevant response system tag is set, and 2) detect context indicates "block process" action. | rollup PreventPolicyResult | Execution handed off to Sensor Preventions (Process Prevention Pipeline [Historical Documentation]), which is a distinct logical component, that *interacts* with the Sensor Detections Pipeline. See Sensor Preventions - Capability - Block Process Creation for rest of execution flow. |
| Kill Process | 1) Relevant response system tag is set, and 2) detect context indicates "kill process" action. | rollup LocalKillProcessRequest | Execution handed off to Sensor Remediations, which is a distinct logical component, that *interacts* with the Sensor Detections Pipeline. See Sensor Remediations - Capability - Kill Process for rest of execution flow. |

FIG. 21

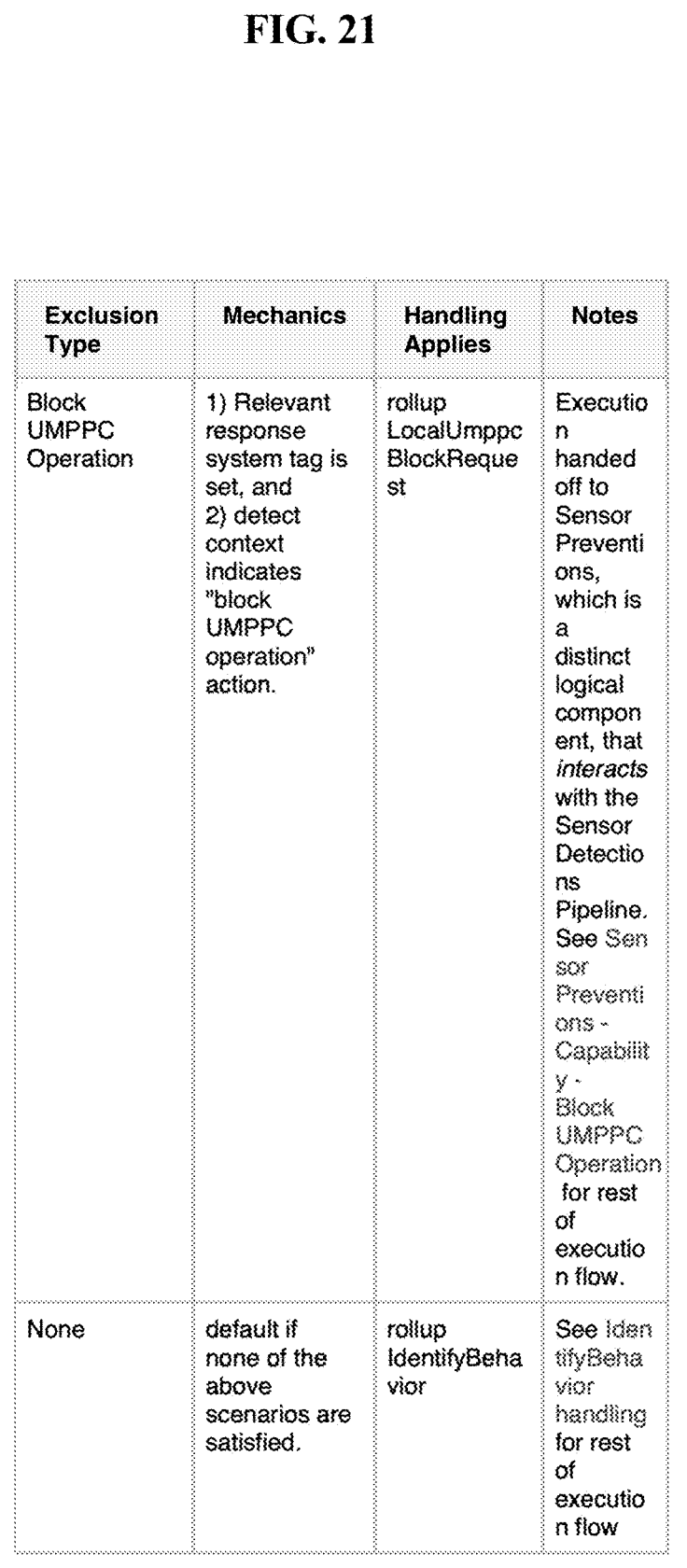

| Exclusion Type | Mechanics | Handling Applies | Notes |
|---|---|---|---|
| Block UMPPC Operation | 1) Relevant response system tag is set, and 2) detect context indicates "block UMPPC operation" action. | rollup LocalUmppc BlockReque st | Executio n handed off to Sensor Preventi ons, which is a distinct logical compon ent, that *interacts* with the Sensor Detectio ns Pipeline. See Sen sor Preventi ons - Capabilit y - Block UMPPC Operation for rest of executio n flow. |
| None | default if none of the above scenarios are satisfied. | rollup IdentifyBeha vior | See Iden tifyBeha vior handling for rest of executio n flow |

| Exclusion Type | Mechanics | Exclusion Applies | Notes |
|---|---|---|---|
| Self-Service IOA Exclusion (SSIOAE) | Match detect process (ImageFileName, CommandLine, PatternId) tuple to entry in SSIOAE Channel | rollup IdentifyBehavior | See IdentifyBehavior handling for rest of execution flow |
| Legacy String-based Whitelist (SBWL) | Match detect process (ImageFileName, CommandLine, PatternId) tuple to entry in legacy SBWL Channel | rollup IdentifyBehavior | See IdentifyBehavior handling for rest of execution flow |

| Exclusion Type | Mechanics | Exclusion Applies | Notes |
|---|---|---|---|
| Per-Pattern Whitelist (PPWL) | Match detect process executable (SHA256HashData, PatternId) tuple to expected exclusion tag in the relevant Module SM table. SM Populated via PPWL and/or prior Lightning responses. | rollup IdentifyBehavior | See IdentifyBehavior handling for rest of execution flow |

FIG. 24

| Exclusion Type | Mechanics | Handling Applies | Notes |
|---|---|---|---|
| Kill Process | 1) Relevant response system tag is set, and 2) detect context indicates "kill process" action. | rollup LocalKillProcessRequest | Execution handed off to Sensor Remediations, which is a distinct logical component, that *interacts* with the Sensor Detections Pipeline. See Sensor Remediations - Capability - Kill Process for rest of execution flow. |
| None | default if none of the above scenarios are satisfied. | rollup IdentifyBehavior | See IdentifyBehavior handling for rest of execution flow |

FIG. 27

| Exclusion Type | Mechanics | Exclusion Applies | Notes |
|---|---|---|---|
| Sensor Visibility Exclusion (SVE) | Match detect process ImageFileName to entry in SVE Channel | Do Nothing. | |
| Self-Service IOA Exclusion (SSIOAE) | Match detect process (ImageFileName, CommandLine, PatternId) tuple to entry in SSIOAE Channel | rollup DetectionExcluded | See DetectionExcluded handling for rest of execution flow |
| Allowlisted | Allowlist Engine matches detect context collection to Allowlist Rule in Allowlist Channel file (s). Allowlist rule sets *classification* to "allowlisted" | rollup DetectionExcluded | See DetectionExcluded handling for rest of execution flow |

FIG. 28

| Exclusion Type | Mechanics | Handling Applies | Notes |
|---|---|---|---|
| Block Process | 1) Relevant response system tag is set, and 2) detect context indicates "block process" action. | rollup PreventPolicyResult | Execution handed off to Sensor Preventions (Process Prevention Pipeline [Historical Documentation]), which is a distinct logical component, that *interacts* with the Sensor Detections Pipeline. See Sensor Preventions - Capability - Block Process Creation for rest of execution flow. |

FIG. 29

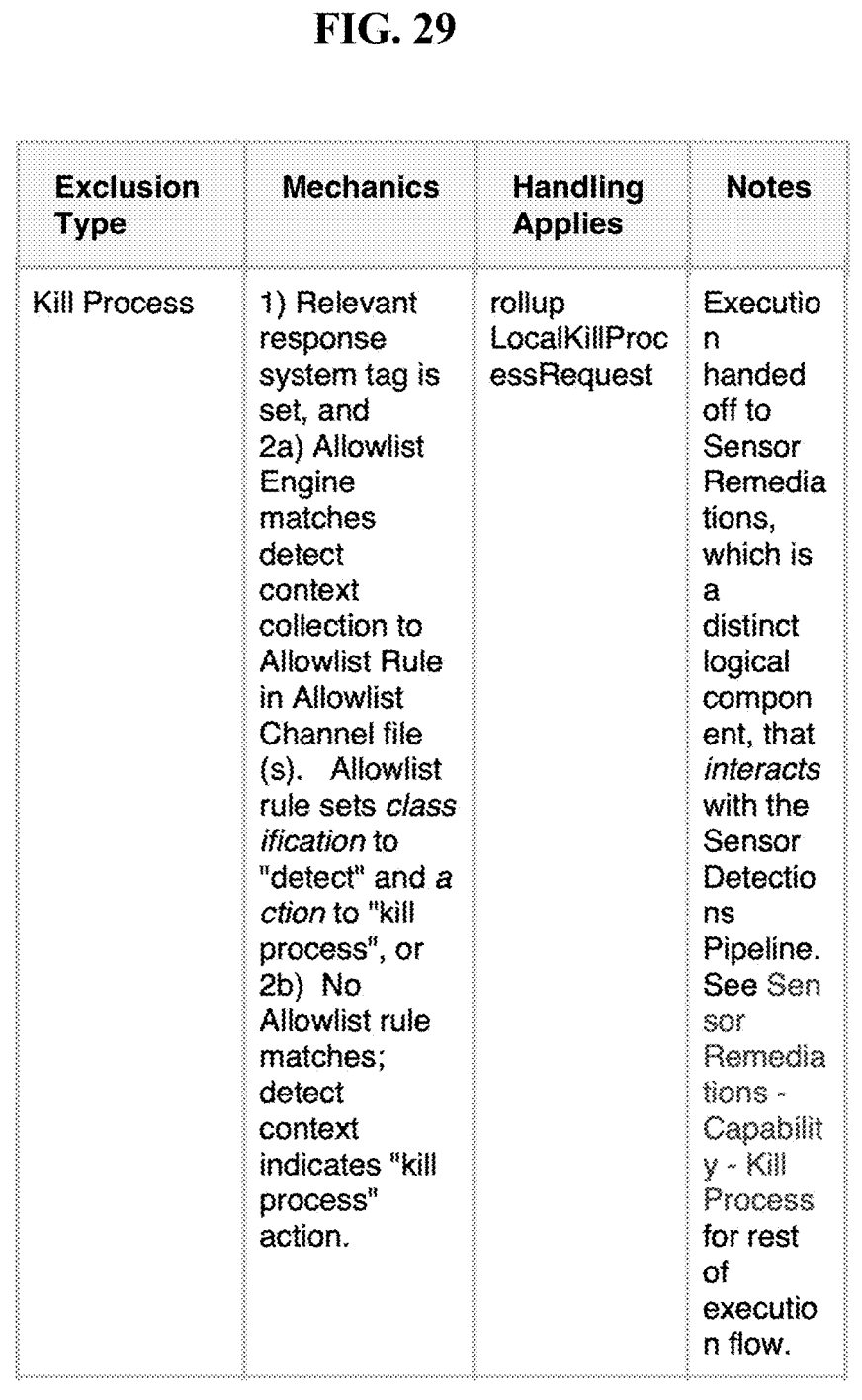

| Exclusion Type | Mechanics | Handling Applies | Notes |
|---|---|---|---|
| Kill Process | 1) Relevant response system tag is set, and 2a) Allowlist Engine matches detect context collection to Allowlist Rule in Allowlist Channel file (s). Allowlist rule sets *class ification* to "detect" and *a ction* to "kill process", or 2b) No Allowlist rule matches; detect context indicates "kill process" action. | rollup LocalKillProc essRequest | Executio n handed off to Sensor Remedia tions, which is a distinct logical compon ent, that *interacts* with the Sensor Detectio ns Pipeline. See Sen sor Remedia tions - Capabilit y - Kill Process for rest of executio n flow. |

FIG. 30

| Exclusion Type | Mechanics | Handling Applies | Notes |
|---|---|---|---|
| Block UMPPC Operation | 1) Relevant response system tag is set, and 2) detect context indicates "block UMPPC operation" action. | Rollup LocalUmppc BlockRequest | Execution handed off to Sensor Mitigations Pipeline. |
| None | default if none of the above scenarios are satisfied. | rollup IdentifyBehavior | See Identify Behavior handling for rest of execution flow |

Figure 31:
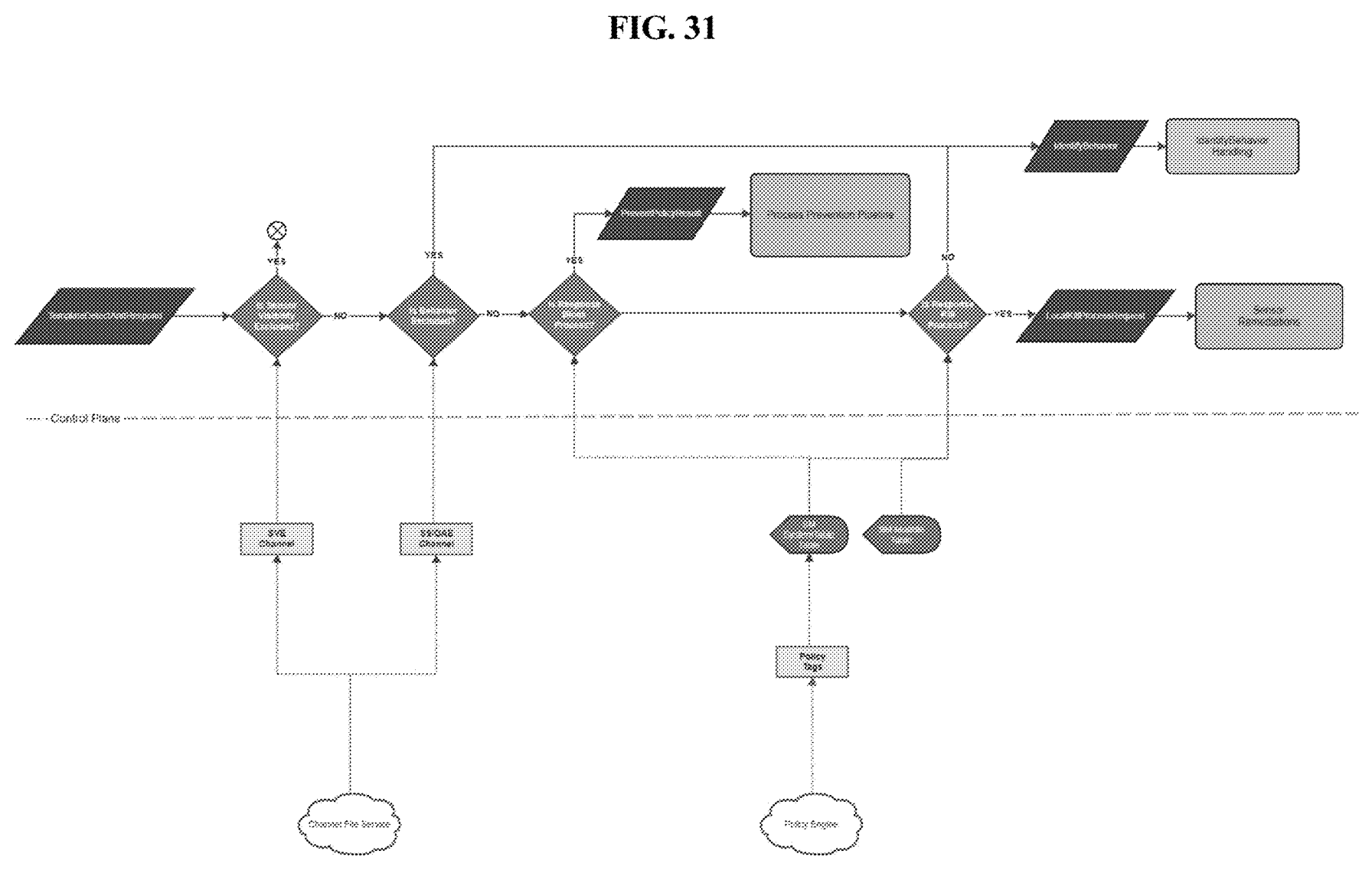

| Exclusion Type | Mechanics | Exclusion Applies | Notes |
|---|---|---|---|
| Sensor Visibility Exclusion (SVE) | Match detect process ImageFileName to entry in SVE Channel | Do Nothing. | |
| Self-Service IOA Exclusion (SSIOAE) | Match detect process (ImageFileName, CommandLine, PatternId) tuple to entry in SSIOAE Channel | rollup DetectionExcluded | See DetectionExcluded handling for rest of execution flow |

FIG. 33

| Exclusion Type | Mechanics | Handling Applies | Notes |
|---|---|---|---|
| Block Process | 1) Relevant response system tag is set, and 2) detect context indicates "block process" action. | rollup PreventPolicyResult | Execution handed off to Sensor Preventions (Process Prevention Pipeline [Historical Documentation]), which is a distinct logical component, that *interacts* with the Sensor Detections Pipeline. See Sensor Preventions - Capability - Block Process Creation for rest of execution flow. |

FIG. 34

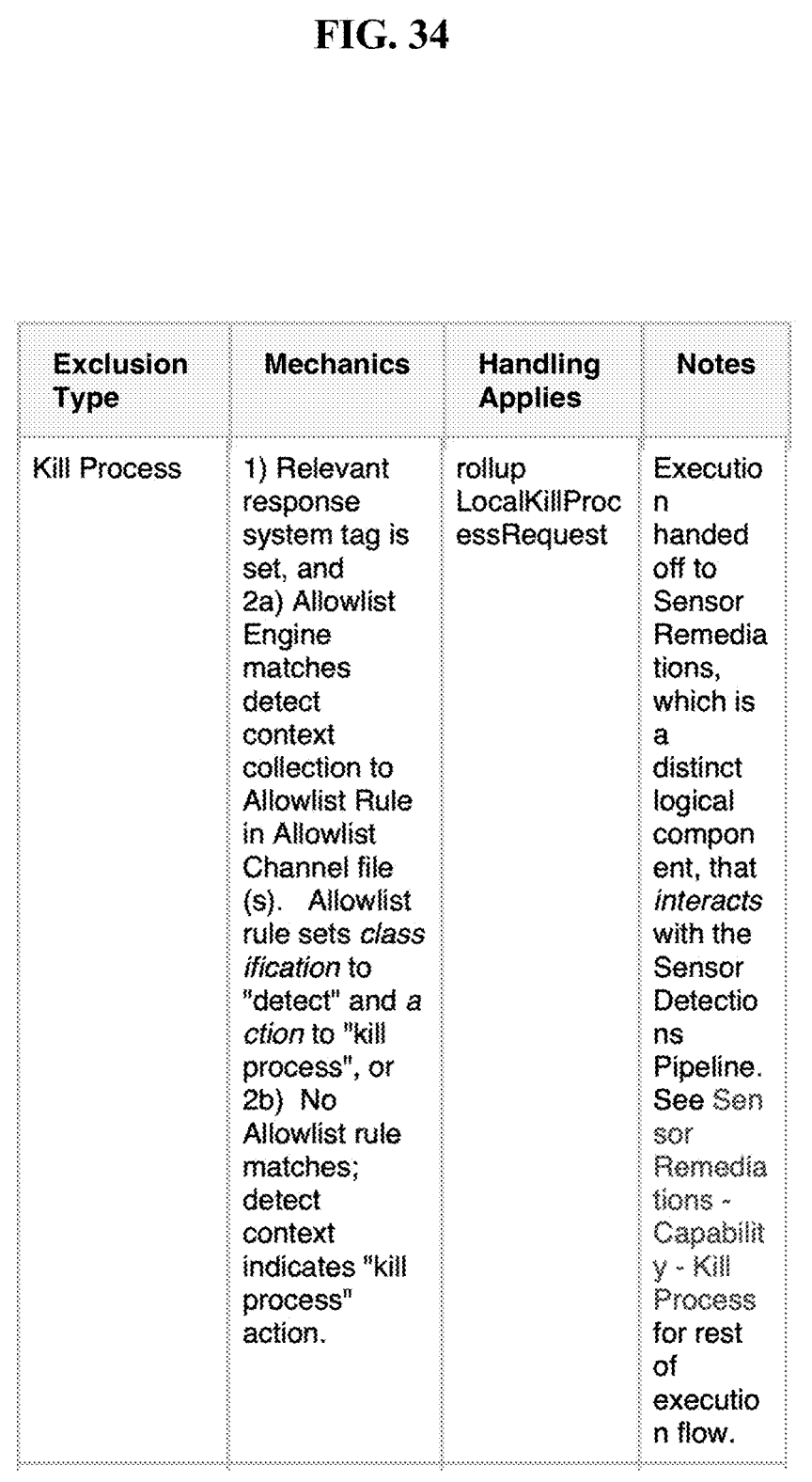

| Exclusion Type | Mechanics | Handling Applies | Notes |
|---|---|---|---|
| Kill Process | 1) Relevant response system tag is set, and 2a) Allowlist Engine matches detect context collection to Allowlist Rule in Allowlist Channel file (s). Allowlist rule sets *class ification* to "detect" and *a ction* to "kill process", or 2b) No Allowlist rule matches; detect context indicates "kill process" action. | rollup LocalKillProc essRequest | Executio n handed off to Sensor Remedia tions, which is a distinct logical compon ent, that *interacts* with the Sensor Detectio ns Pipeline. See Sen sor Remedia tions - Capabilit y - Kill Process for rest of executio n flow. |

FIG. 35

| Exclusion Type | Mechanics | Handling Applies | Notes |
|---|---|---|---|
| None | default if none of the above scenarios are satisfied. | rollup IdentifyBeha vior | See Identify Behavior for rest of Execution Flow |

Figure 37:
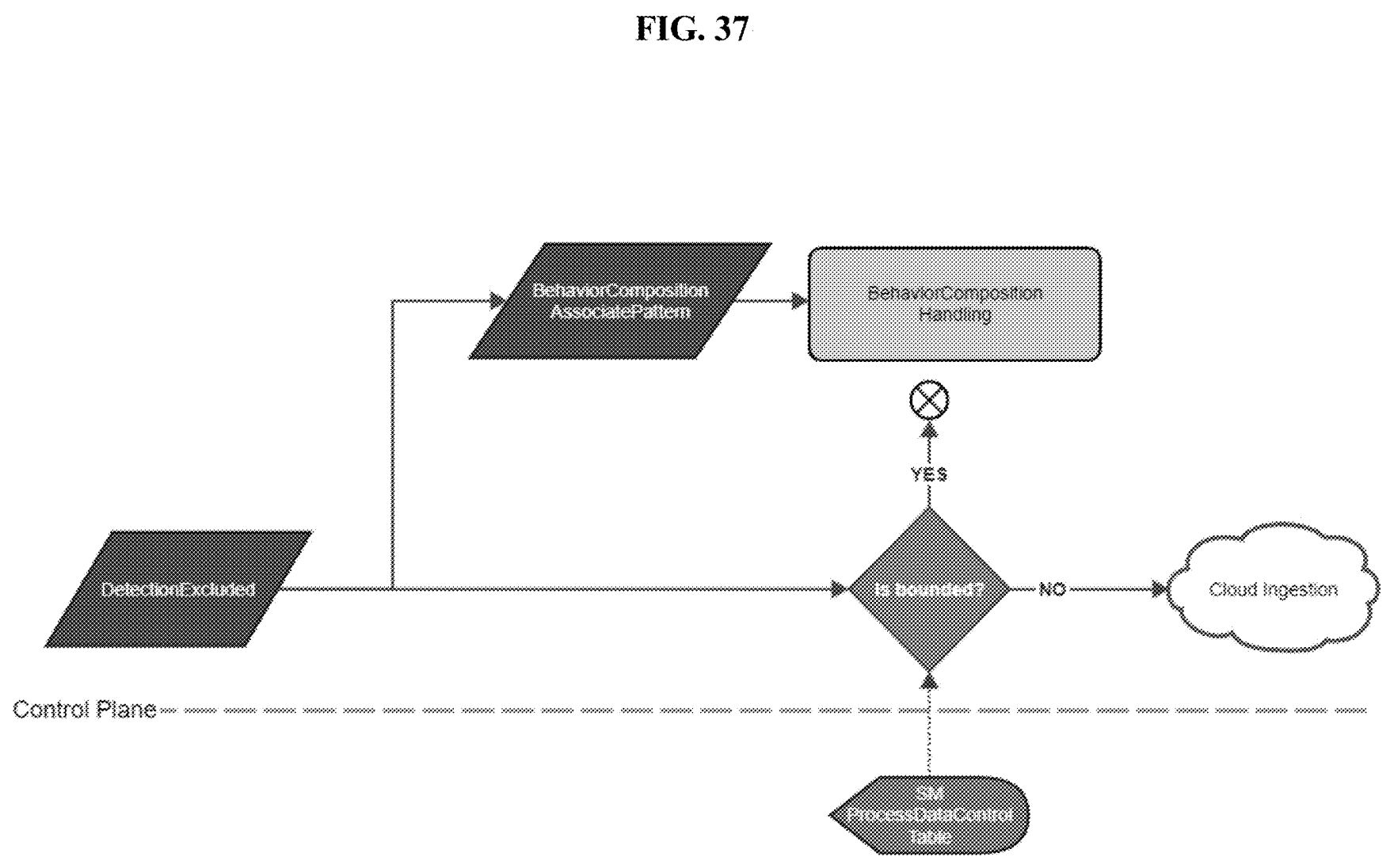

| Detection Exclusion Source | Platform Support |
|---|---|
| Self-Service IOA Exclusion (SSIOAE) | Windows Mac Linux |
| Legacy String-based Whitelist (SBWL) | Windows Mac Linux |
| Per-Pattern Whitelist (PPWL) | Windows Mac Linux |
| Allowlisting Engine Classification: Allowlisted | Windows |

Figure 39:
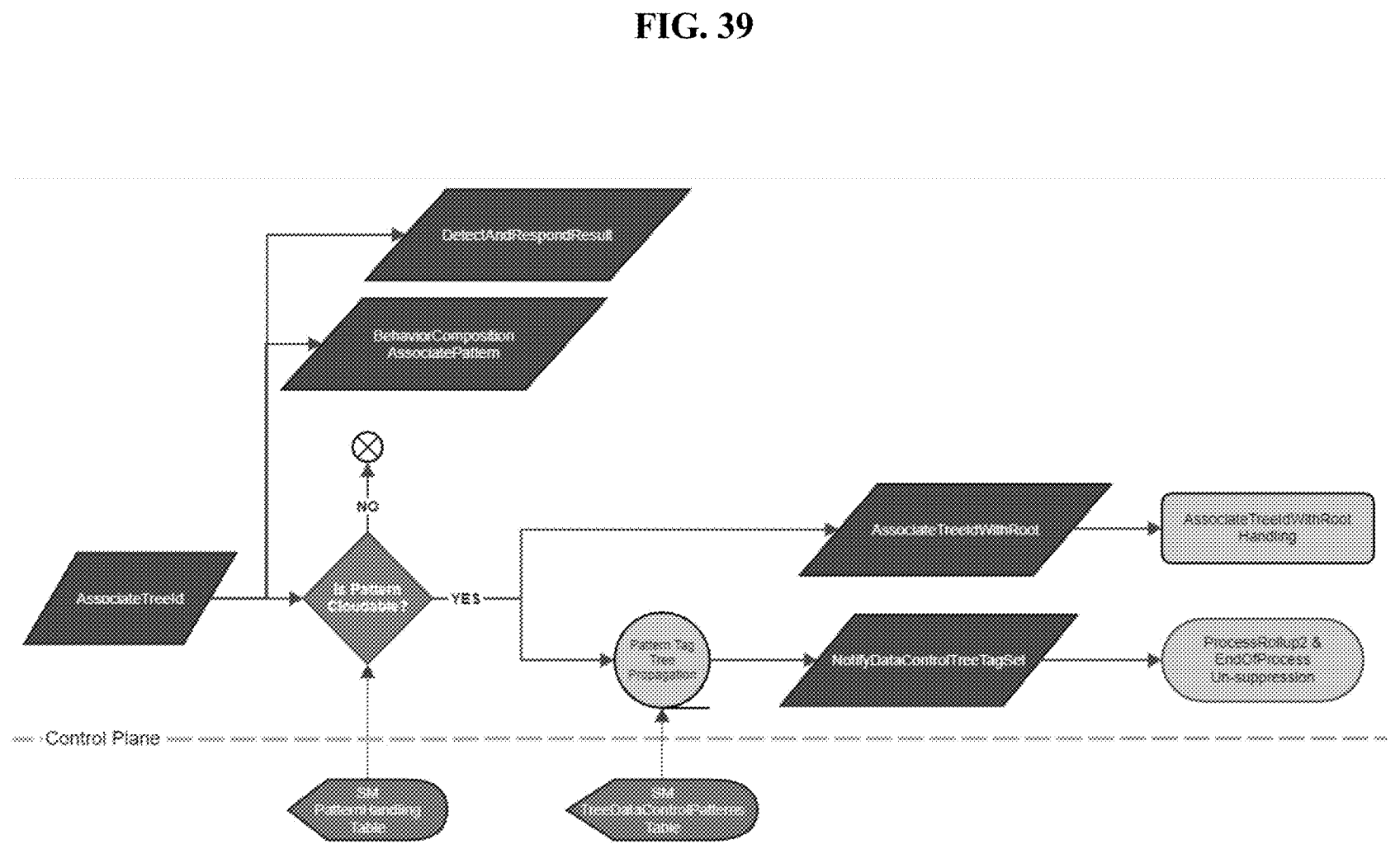

Figure 41:
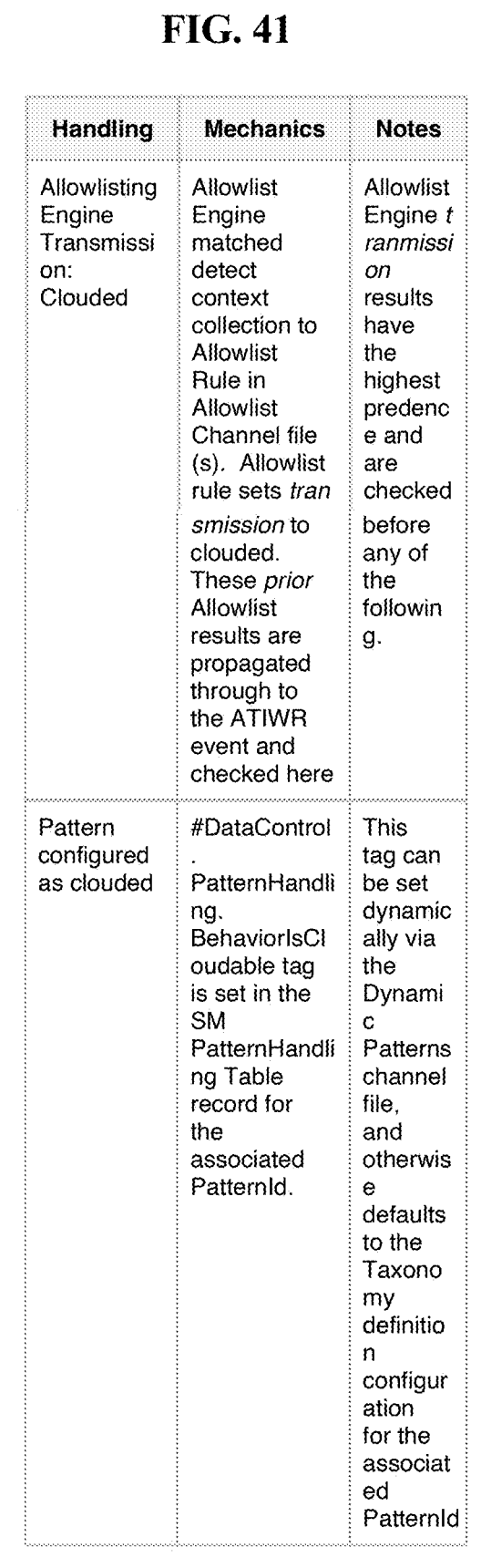

| Handling | Mechanics | Notes |
|---|---|---|
| Allowlisting Engine Transmission: Clouded | Allowlist Engine matched detect context collection to Allowlist Rule in Allowlist Channel file (s). Allowlist rule sets *tran smission* to clouded. These *prior* Allowlist results are propagated through to the ATIWR event and checked here | Allowlist Engine *t ranmissi on* results have the highest predenc e and are checked before any of the followin g. |
| Pattern configured as clouded | #DataControl . PatternHandli ng. BehaviorIsCl oudable tag is set in the SM PatternHandli ng Table record for the associated PatternId. | This tag can be set dynamic ally via the Dynami c Patterns channel file, and otherwis e defaults to the Taxono my definitio n configur ation for the associat ed PatternId |

FIG. 43

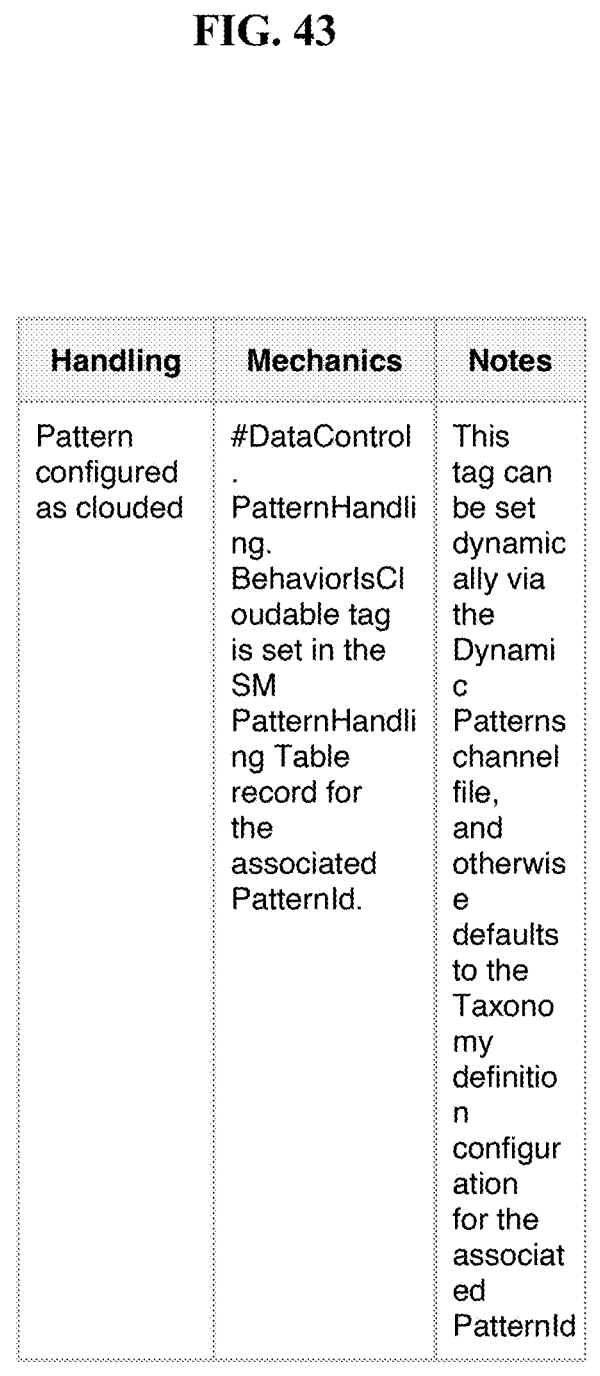

| Handling | Mechanics | Notes |
|----------|-----------|-------|
| Pattern configured as clouded | #DataControl. PatternHandling. BehaviorIsCloudable tag is set in the SM PatternHandling Table record for the associated PatternId. | This tag can be set dynamically via the Dynamic Patterns channel file, and otherwise defaults to the Taxonomy definition configuration for the associated PatternId |

FIG. 45

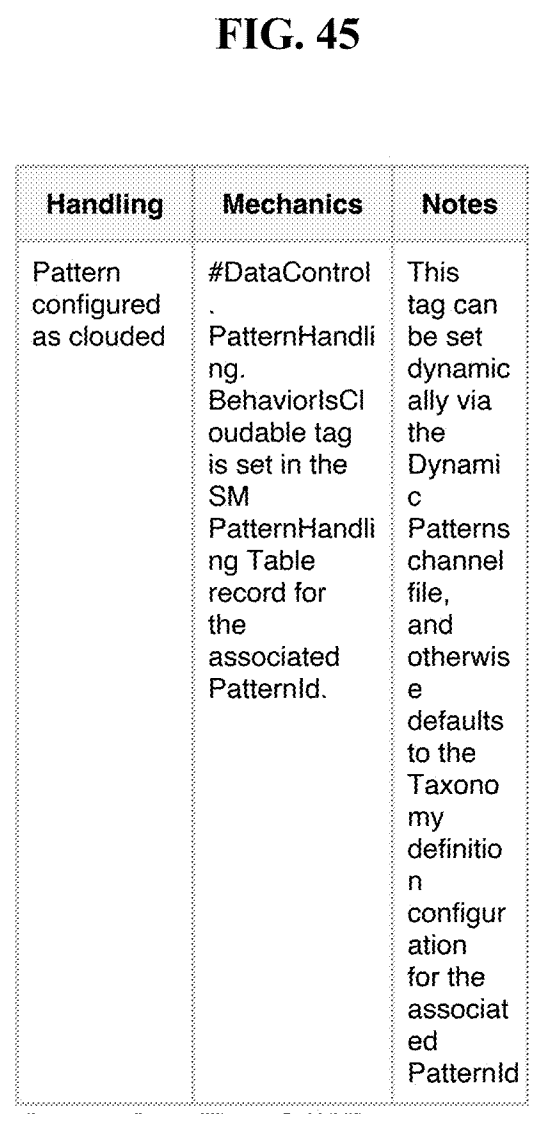

| Handling | Mechanics | Notes |
|---|---|---|
| Pattern configured as clouded | #DataControl . PatternHandli ng. BehaviorIsCl oudable tag is set in the SM PatternHandli ng Table record for the associated PatternId. | This tag can be set dynamic ally via the Dynami c Patterns channel file, and otherwis e defaults to the Taxono my definitio n configur ation for the associat ed PatternId |

Figure 47:
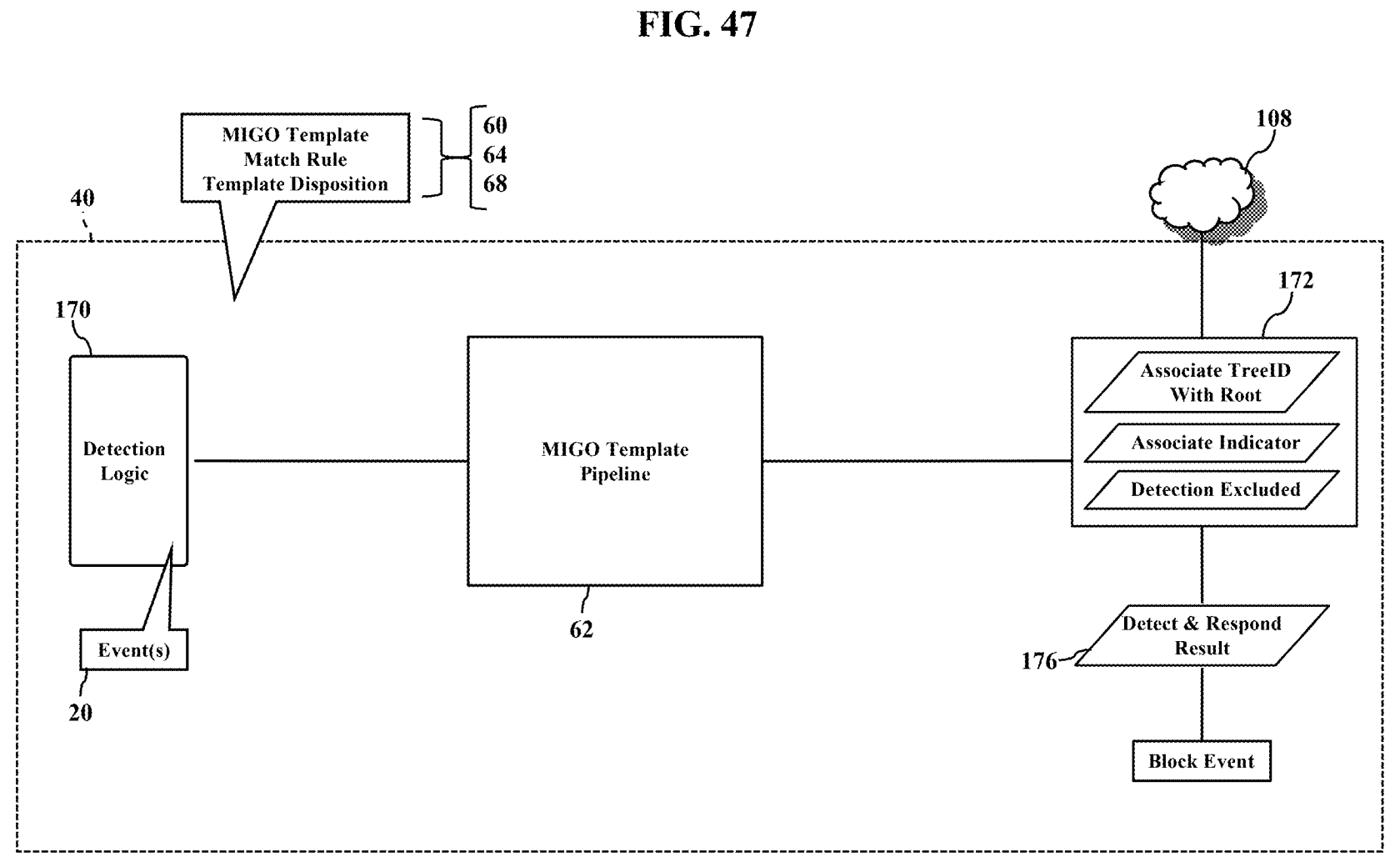

Figure 48:
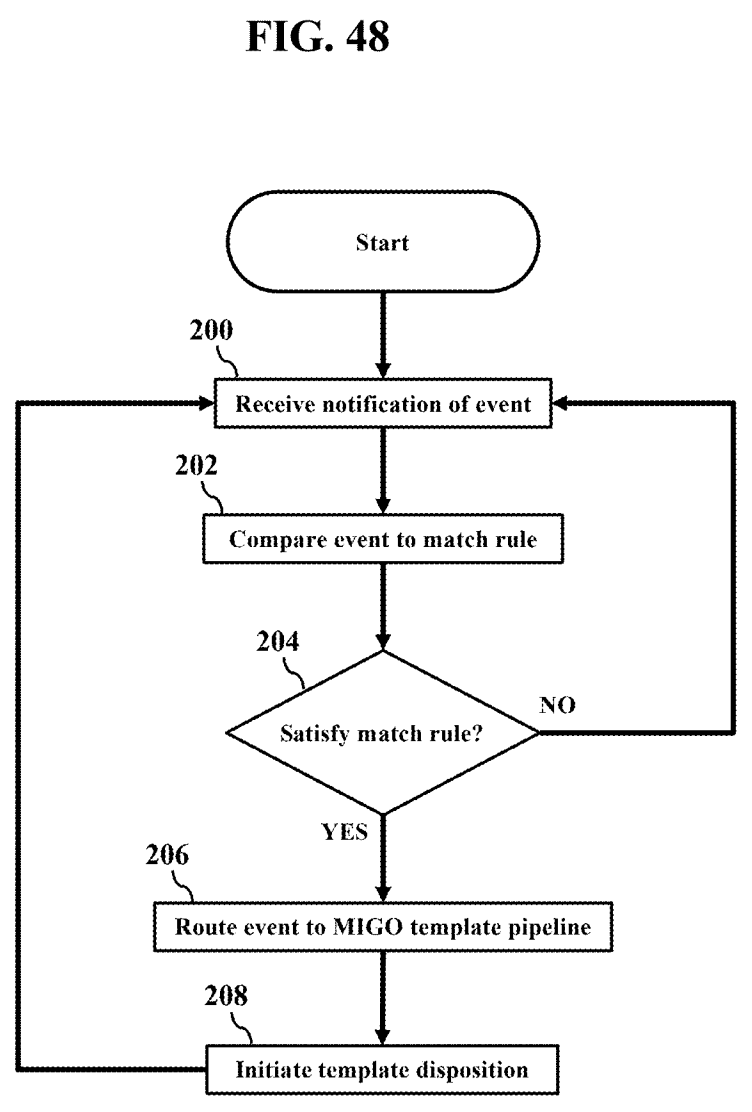

Start

Receive notification of event    200

Compare event to match rule    202

Satisfy match rule?    204

NO

YES

Route event to MIGO template pipeline    206

Initiate template disposition    208

MULTI-INSTANCE GENERIC OPERATION PIPELINE

BACKGROUND

The subject matter described herein generally relates to computers and, more particularly, the subject matter relates to endpoint hardware and software event detection and response.

Best practices in IT rely on behavior monitoring. Information technology (or IT) experts recommend that all computers implement a monitoring service. The monitoring service detects computer behaviors for performance improvements and safe usage. The monitoring service may also detect abnormal computer behavior that indicates suboptimal performance or perhaps even a cyber security threat.

SUMMARY

An event detection service responds to an event behavior observed at an endpoint device. An agent running on a host monitors its host's event behaviors and compares the event behaviors to a template. If the host's event behaviors satisfy the template, then the agent inputs the event behaviors to a Multi-Instance Generic Operation (MIGO) template pipeline. The template pipeline generically processes the event behaviors. The template pipeline may also locally implement a template disposition, as specified by the template. The agent may thus dynamically detect and generically process an event behaviors for various purposes.

BRIEF DESCRIPTION OF THE SEVERAL VIEWS OF THE DRAWINGS

The features, aspects, and advantages of the Multi-Instance Generic Operation (or MIGO) Templates and Pipeline are understood when the following Detailed Description is read with reference to the accompanying drawings, wherein:

FIG. 3 illustrates examples of an endpoint detection agent;

FIG. 5 illustrates examples of template dispositions;

FIGS. 6-8 illustrate still more examples of the templates and the template pipeline;

FIGS. 9-14 illustrate examples of an Identify Behavior generic process;

Figure 22:
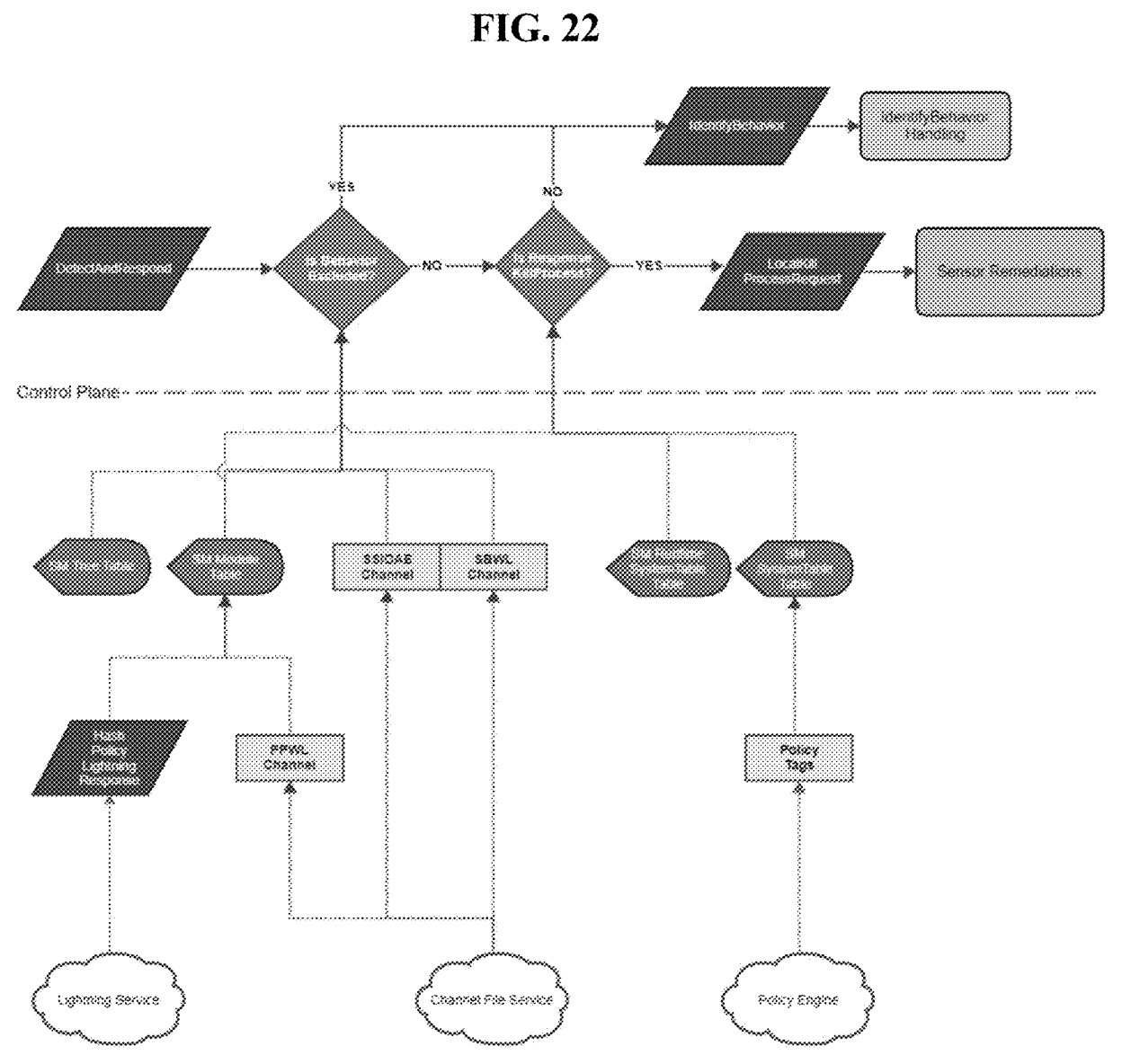

FIGS. 15-24 illustrate examples of a Detect & Respond generic process;

FIGS. 25-35 illustrate examples of a Template Detect & Respond generic process;

FIGS. 37-47 illustrate examples of outputs generated by the template pipeline;

FIG. 48 illustrates examples of a method or operations executed by the endpoint detection agent that detects the event(s) of interest;

DETAILED DESCRIPTION

Figure 1:
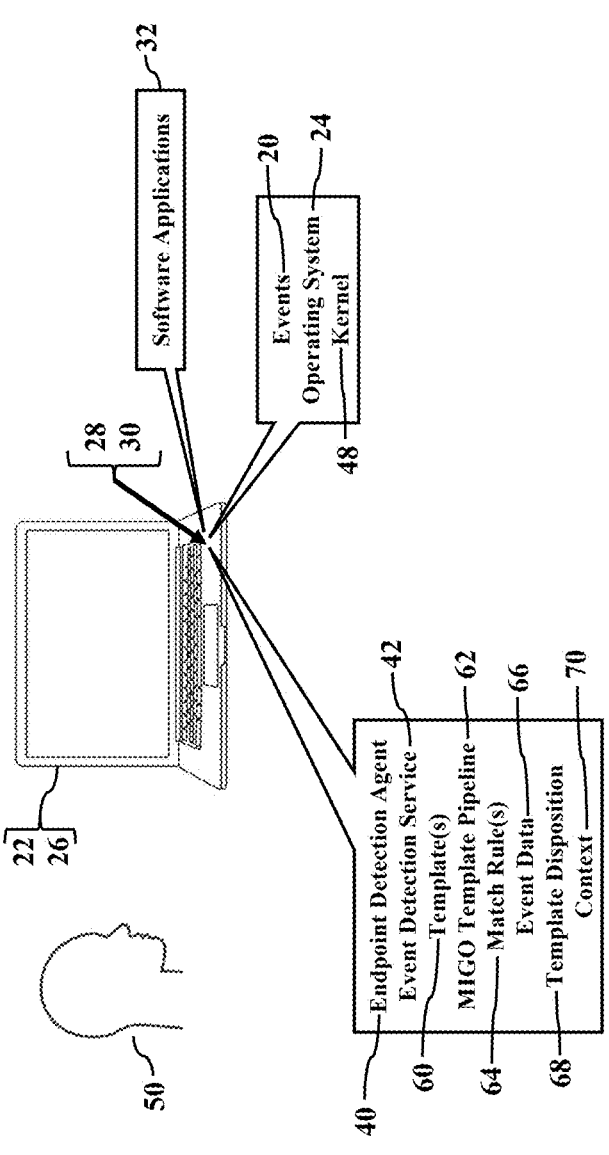
FIG. 1 illustrates some examples of template-based detection of computer events.

Some examples relate to endpoint detection of hardware and software events. When we use a computer, the computer exhibits a behavior. The computer's behavior is caused by software applications interfacing with an operating system. Most of the software applications cause useful and safe computer behavior. Some of the software applications, though, cause abnormal or even malicious computer behavior. It's best practice, then, to monitor the computer's behavior. This disclosure thus describes an event detection service that monitors a computer's behavior. The event detection service downloads an endpoint detection agent to devices. The endpoint detection agent may thus be an "app" that monitors each one of our devices for specific computer behaviors. The endpoint detection agent, in other words, monitors the software applications that run on a smartphone, laptop, or other host computer. The endpoint detection agent monitors events, activities, messages, and other computer behaviors conducted by the host computer. The endpoint detection agent compares the host's computer behavior to a template. The template describes or targets the computer behaviors that are of interest. If the host's computer behaviors satisfy the template, then the endpoint detection agent processes the host's computer behaviors using a template pipeline. The template pipeline provides generic processing for a computer behavior. The template pipeline may also locally implement a template disposition, as specified by the template. So, whatever the host's computer behavior (i.e., safe or harmful), and no matter how the computer's behavior is specified, the template pipeline quickly detects and responds to computer behaviors of interest.

The Multi-Instance Generic Operation (MIGO) pipeline, also referred to as a MIGO template pipeline or simply a pipeline, is dynamically configured and installed. For instance, a template describes one or more targeted computer behaviors of interest. In some examples, the endpoint detection agent monitors for the computer behaviors specified by the template. Indeed, an administrative user may, within minutes, dynamically configure and deploy the template to hundreds or even thousands of computers in the field for real time monitoring and detection of targeted computer behaviors.

The Multi-Instance Generic Operation (MIGO) pipeline generically process a computer behavior. Upon detection of a computer behavior, the MIGO pipeline processes the computer behavior using a language, symbol, number, character, combination of characters, and/or operators. Conventional behavioral detection schemes can only detect textual characters (such as regular expression strings using alphabetical characters a, b, c, . . . z). The template and pipeline, however, may detect much more than mere textual matches. The template and pipeline, for example, detects and processes non-textual numbers, hash values, sets, subsets, Boolean operators, and other symbols and characters desired by the user/author of the template. Moreover, the template and pipeline also allow the user/author to specify multiple template dispositions. So, when the endpoint detection agent detects a targeted computer behavior, the endpoint detection agent may implement multiple template dispositions as responsive actions. The event detection service thus allows the user/author to create sophisticated, expressive, and concise templates that are far simpler and faster to implement.

Examples of the Multi-Instance Generic Operation (or MIGO) pipeline will now be described more fully hereinafter with reference to the accompanying drawings. The pipeline, however, may be embodied in many different forms and should not be construed as limited to the examples set forth herein. These examples are provided so that this disclosure will be thorough and complete and fully convey aspects of the MIGO pipeline to those of ordinary skill in the art. Moreover, all the examples of the pipeline are intended to encompass both structural and functional equivalents thereof. Additionally, it is intended that such equivalents include both currently known equivalents as well as equivalents developed in the future (i.e., any elements developed that perform the same function, regardless of structure).

FIG. 1 illustrates examples of template-based detection of computer events 20. A computer system 22 stores and executes an operating system 24. FIG. 1 illustrates the computer system 22 as a laptop computer 26, but the computer system 22 may be any processor-controlled device (as later paragraphs explain). The laptop computer 26 stores the operating system 24 in a memory device 28, and the laptop computer 26 has a hardware processor 30 that executes the operating system 24. The laptop computer 26 also stores many software applications 32 in the memory device 28. A human user 50 of the laptop computer 26 may configure an endpoint detection agent 40 to target specified events 20 of interest. The endpoint detection agent 40, for example, may utilize templates 60. A template 60 affects the dynamic behavior of the endpoint detection agent 40. The endpoint detection agent 40 leverages a template pipeline 62 to process the templates 60. For instance, the template pipeline 62 is a component of the endpoint detection agent 40. The template pipeline 62 processes the templates 60 to dynamically alter the behavior of the endpoint detection agent 40, in response to events 20. As very simple examples, each template 60 specifies one or more target events 20 that the endpoint detection agent 40 should detect. Moreover, the template 60 may also specify match rules 64 defining what actions the endpoint detection agent 40 takes in response to detecting the target event or events 20. The template 60 thus controls the behavior of the endpoint detection agent 40, perhaps at defined events 20. As the endpoint detection agent 40 monitors/inspects the events 20, the endpoint detection agent 40 may gather event data 66 associated with the events 20. The event data 66 describes specific details, metadata, and other information regarding the event/events 20. The endpoint detection agent 40 compares the event or events 20 and/or the event data 66 to each template 60. If the endpoint detection agent 40 determines a match between the event(s) 20 and/or the event data 66 and a template 60, then the endpoint detection agent 40 continues executing the corresponding match rule(s) 64 specified by the template 60. The endpoint detection agent 40, for example, executes a template disposition 68 specified by the template 60. The template disposition 68 specifies the actions or activities taken by the endpoint detection agent 40 in response to the match between the event(s) 20 and the template 60.

Each template 60 can thus define custom, bespoke handling. The template pipeline 62 provides centralized and generic processing for templates 60 and, as such, for their custom, bespoke handling. In some examples, the template pipeline 62 implements new use cases for the endpoint detection agent 40, and these new use cases introduce new points of dynamism. Indeed, the template pipeline 62 minimizes the amount of effort required to introduce new points of dynamism, and the template pipeline 62 standardizes the behavior of the endpoint detection agent 40. The template pipeline 62 abstracts away as much complexity as possible from the author of the template 60, thus allowing the author to exclusively focus development efforts on the specific needs of a dynamic use case. The template pipeline 62 allows for custom and bespoke handling on a per-template 60 basis. If an author extends the functionality (and/or behavior) of the template pipeline 62 (e.g., through extensible interfaces exposed by the template pipeline 62), that new functionality can be limited and targeted to the particular use case defined by its corresponding template 60. New functionality may also be exposed to other template use cases (in effect expanding the generic handling capabilities of the template pipeline 62, available for templates 60).

In some examples, the template pipeline 62 is agnostic. The template pipeline 62 allows template authors (such as the user 50) to create new and varied use cases, perhaps within the bounds and design of the template pipeline 62. Because the template pipeline 62 has an extensible design, the template pipeline 62 allows developers to have the benefits of a generalized infrastructure which minimizes the amount of work and effort required to deploy new use cases. The template pipeline 62 also offers service/function extensions, which allows developers to satisfy their custom use-case requirements. The extensions increase the general capabilities of the template pipeline 62, thus allowing other developers and template use cases to further leverage those new capabilities. The template pipeline 62 need not care about the content of the template 60. As long as the template 60 conforms to minimum or basic formatting needs, the template pipeline 62 executes the template 60. The user 50 may thus configure the template pipeline 62 to detect, and to respond to, one or more events(s) 20 specified by the template 60.

The template pipeline 62 provides still more service features. The template pipeline 62 supports context collections. That is, when the computer system 22 receives electrical power and operates (such as via a battery or power supply), the hardware processor 30 executes the endpoint detection agent 40. The endpoint detection agent 40 monitors the events 20 associated with the software applications 32, the operating system 24, the hardware processor 30, and/or the memory device 28. The endpoint detection agent 40, in particular, may determine a current context 70 using sequences, series, or streams of the events 20. The template pipeline 62 may then use the context 70 to determine which one or more of the templates 60 is selected for execution. The template pipeline 62 may also use the context 70 for extensibility and versioning purposes. The template pipeline 62 also provides built in support for identification (or ID) neutral pattern association and response capabilities. The template pipeline 62 provides built in flexibility for other types of ID association (such as container ID, user ID, or specific customer/service IDs).

Figure 2:
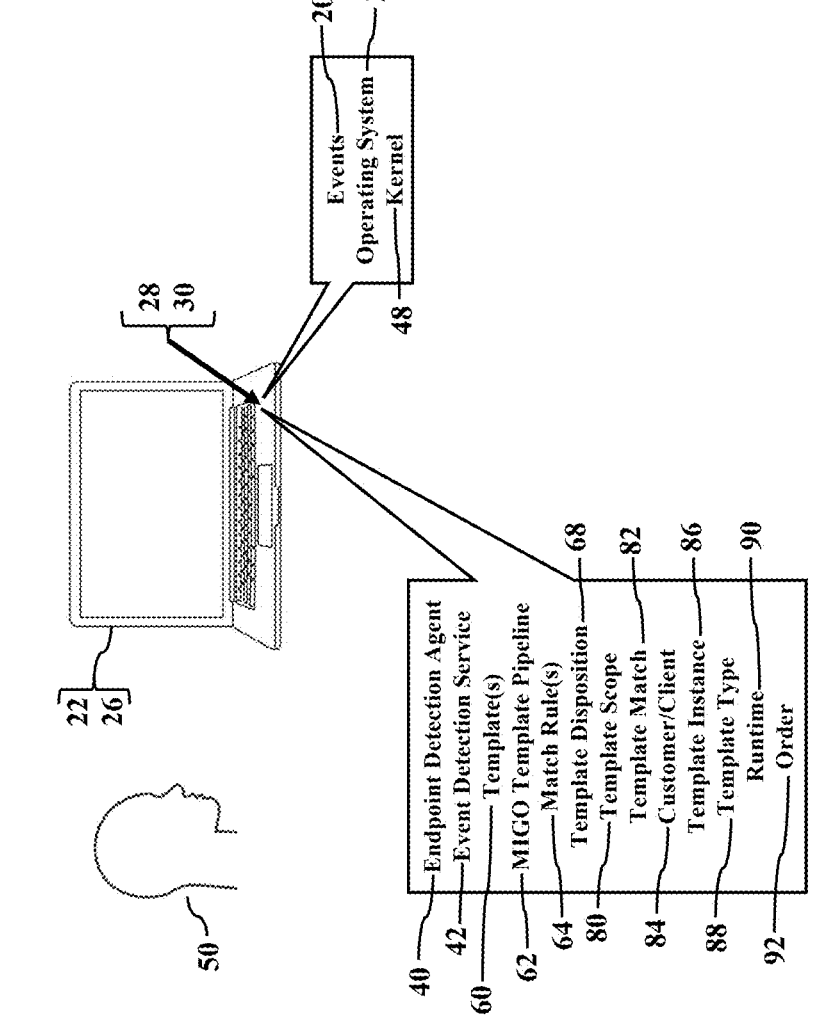
FIG. 2 illustrates examples of templates.

FIG. 2 illustrates more examples of the templates 60. Each template 60 allows the template-content author to specify/control three (3) basic aspects of dynamic detection content. The three (3) basic aspects of dynamic detection content define a template scope 80, a template match 82, and the template disposition 68. In simple words, these three (3) basic aspects allow the author to specify the who, when, and what associated with the template 60.

The template scope 80, for example, identifies a who component of the template 60. The template scope 80 may include a data field, parameter, value, or other alphanumeric that uniquely identifies the user 50 of the computer system 22 and/or a customer/client 84 associated with the user 50 and/or with the computer system 22. The template scope 80, however, may additionally or alternatively specify the computer system 22 (such as by an IP address). The template scope 80, in other words, may be a party or machine identifier that instructs the host computer system 22 and/or the endpoint detection agent 40 which person(s), customer(s), and/or device(s) will receive a particular set of dynamic content associated with the template 60.

The template match 82 specifies the when component of the template 60. The template match 82 specifies when the endpoint detection agent 40 will execute the corresponding template 60. The template match 82 may be specified by the template author to define the conditions/actions/time that cause the endpoint detection agent 40 to execute the corresponding template 60. While a triggering scheme or mechanism may be used, FIG. 3 illustrates the one or more match rules 64 that define the triggering events 20. Each match rule 64 may thus be a logical statement using a specific series or sequence of the events 20 that triggers execution of the corresponding template 60.

The template disposition 68 specifies the what component of the template 60. The template disposition 68 specifies which action or actions the endpoint detection agent 40 will execute in response to detecting the template scope 80 and the template match 82. The template disposition 68 allows the content author to specify what action(s) the endpoint detection agent 40 implements in response to detecting an event or events 20 that matches/match a given set of match rules 64.

A template 60, in general, may have these three (3) basic aspects of dynamic detection content (e.g., the template scope 80, the template match 82, and the template disposition 68). The template scope 80, the template match 82, and the template disposition 68 instruct the endpoint detection agent 40 who will receive the dynamic match rules 64, when the match rules 64 will trigger the template match 82 on an event 20, and what the endpoint detection agent 40 will do in response to the match.

Moreover, the template 60 and the MIGO template pipeline 62 also allow the user/author to specify multiple, different template dispositions 68. So, when the endpoint detection agent 40 detects one or more targeted computer behavioral events 20, the endpoint detection agent 40 may implement multiple template dispositions 68 as responsive actions. The event detection service 42 thus allows the user/author to create sophisticated, expressive, and concise templates 60 that are far simpler and faster to implement.

The template 60 and the MIGO template pipeline 62 can be dynamically configured and installed. For example, the user 50 merely makes simple selections via the graphical user interface 100. The event detection service 42 generates the template 60 using the user's simple selections. The event detection service 42 then deploys the template 60 to the endpoint detection agent 40 installed to the host computer system 22. The endpoint detection agent 40 quickly and dynamically implements the template 60. The endpoint detection agent 40 then monitors for the computer behaviors specified by the template 60. Indeed, an administrative user 50 may dynamically configure and deploy the template 60 to hundreds or even thousands of computers in the field for real time monitoring and detection of targeted computer behaviors.

FIG. 3 illustrates more examples of the endpoint detection agent 40. The operating system 24 may interface with the endpoint detection agent 40 as an antimalware driver. The endpoint detection agent 40 is installed on the computer system 22, is stored by the memory device 28, and is executed by the hardware processor 30. The endpoint detection agent 40, for example, may have kernel-level components 140a having kernel-level permissions to the kernel 48 of the operating system 24. The endpoint detection agent 40 may additionally have user-mode components 140b having user-level permissions to a user mode of the operating system 24. The endpoint detection agent 40 may include computer program, code, or instructions that scan and monitor the computer system 22 for the events 20 (such as communications, processes, activities, behaviors, data values, usernames/logins, locations, contexts, and/or patterns) specified by the template 60. Because the endpoint detection agent 40 has kernel-level permissions, the endpoint detection agent 40 may monitor kernel-level activity and/or user-mode activity conducted by the computer system 22. The endpoint detection agent 40 may register for and receive kernel-level notifications and call backs from the kernel 48.

Figure 4:
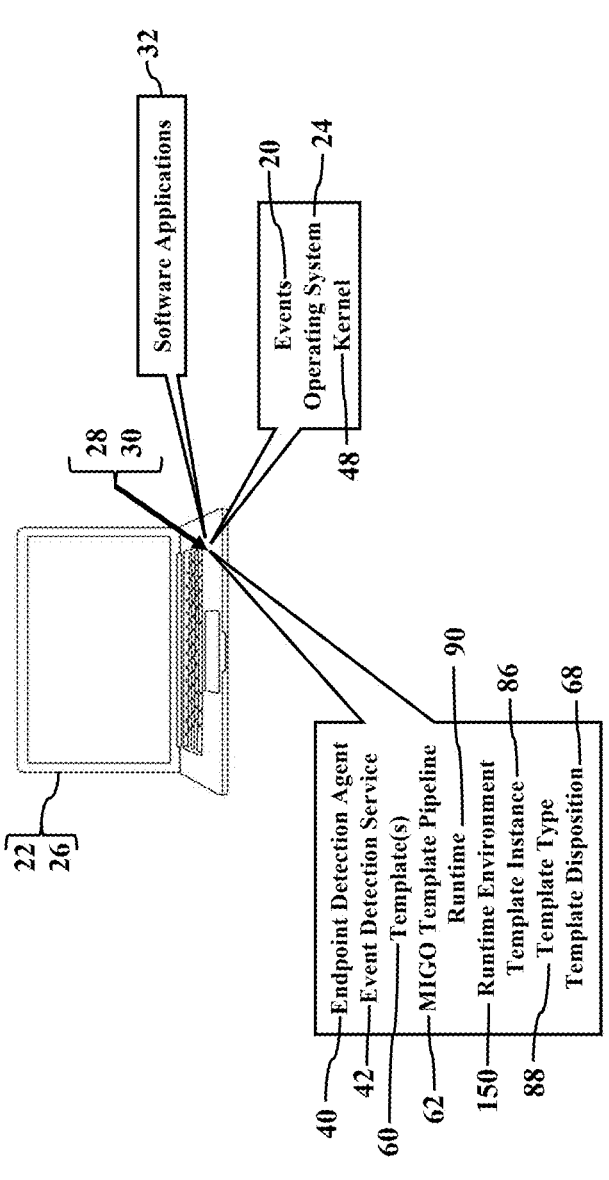
FIG. 4 illustrates examples of a runtime environment.
Figure 17:
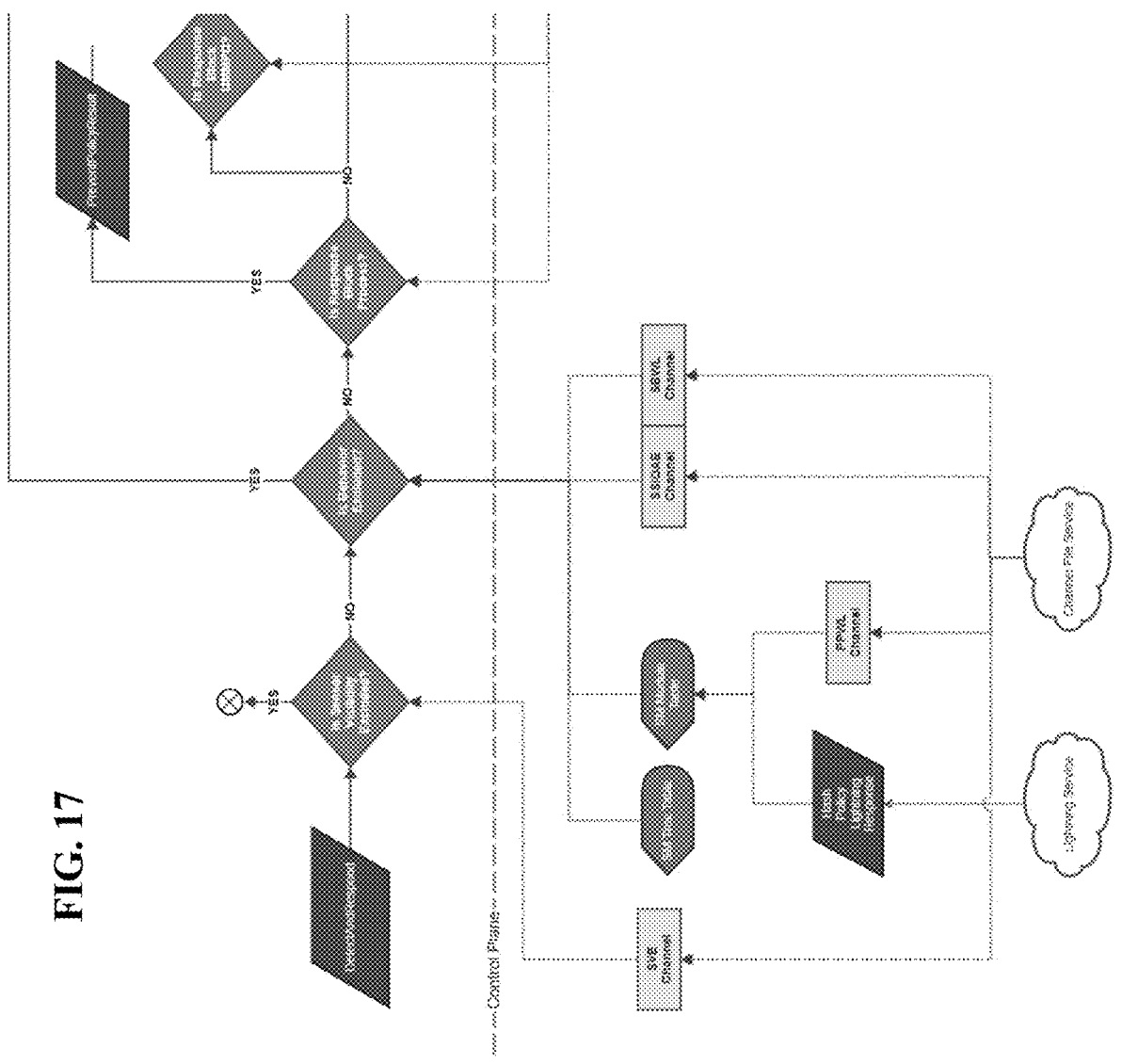
Figure 18:
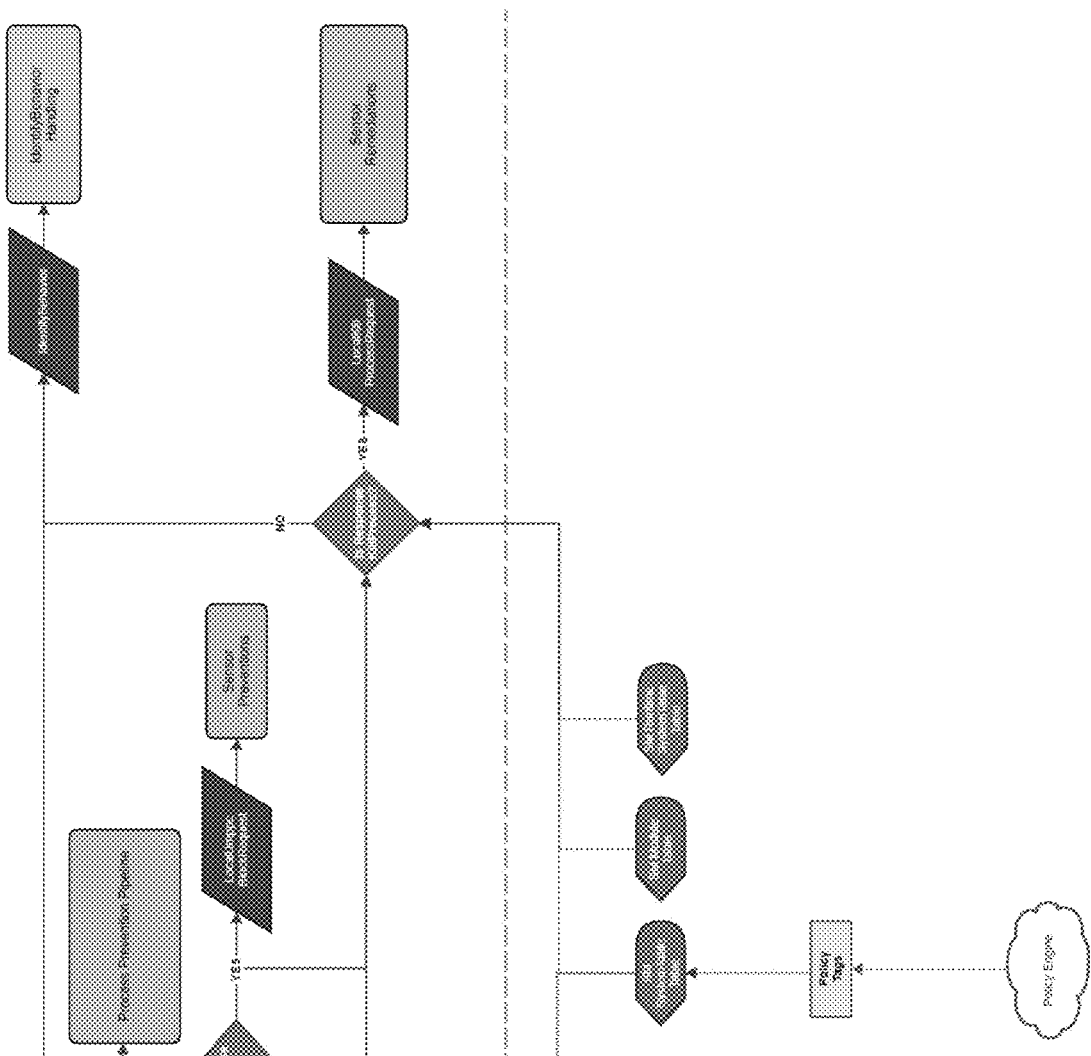

FIG. 4 illustrates examples of a runtime environment 150. The behavior of the computer system 22 may dynamically change according to the runtime environment 150. As the laptop computer 26, for example, operates in different runtime environments 150, many runtime values and runtime file locations may change. These runtime values and runtime file locations may not be known until defined by the operating system 24 and/or until defined by starting some other software application 32. The endpoint detection agent 40 may thus evaluate, and/or re-evaluate, the templates 60 at each runtime 90 associated with each runtime environment 150. With the templates 60, a single trigger event 20 on the endpoint detection agent 40 can match more than one template instance 86. Every template type 88, for example, may have either a single trigger event 20 or a set of multiple trigger events 20 configured in the endpoint detection agent 40. When the endpoint detection agent 40 detects triggering event(s) 20 for a template type 88, the endpoint detection agent 40 may evaluate all of the template instances 86 of that template type 88 (perhaps that the endpoint detection agent 40 knows about). Every template instance 86 has the one or more template dispositions 68 which tell the endpoint detection agent 40 what to do when a matching event 20 occurs. If a single event 20 matches more than one template instance 86, the endpoint detection agent 40 at runtime 90 may collate all template dispositions 68 for all matching template instances 86 for a given event 20 and take all of the specified template dispositions 68 in response to the event 20.

FIG. 5 illustrates more examples of other template dispositions 68. Here the computer system 22 is illustrated as a computer server 160. Most template dispositions 68 are results returned by the MIGO template pipeline 62 (e.g., the template engine) which tell the rest of the endpoint detection agent 40 how to respond when a match occurs. The templates 60 may be configured/written for a template disposition 68 desired by the author of the template content. FIG. 5, though, illustrates two template dispositions 68 (e.g., a NO_ACTION and a CANCEL_Instance) that differ and that do not tell the rest of the endpoint detection agent 40 how to respond when a match occurs. These template dispositions 68, instead, impact how the MIGO template pipeline 62 evaluates the input event 20 against other template instances 86. The NO_ACTION template disposition 68 may be the match rule 64 that tells the MIGO template pipeline 62 (e.g., the template engine) to ensure that no other template dispositions 68 or other actions will be taken for template instances 86 in the same or lower template scopes 80 for the input event 20 in question. That is, the NO_ACTION template disposition 68 effectively cancels all other template instances 86 in the same or lower template scopes 80. The CANCEL_INSTANCE template disposition 68 may be another match rule 64 that tells the MIGO template pipeline 62 (e.g., the template engine) to ignore matches of one other specific template instance 86. The CANCEL_INSTANCE template disposition 68 comes with the numeric ID of a target template instance 86 which will be cancelled or ignored when the instance matches. When the CANCEL_INSTANCE template disposition 68 match occurs on an event 20, the MIGO template pipeline 62 may continue processing the event 20 against other template instances 86 but will not generate a match against the instance which was the target of cancellation (even if the cancellation target would otherwise have matched).

There may be configurational usage parameters or requirements. The template instance 86 with the NO_ACTION template disposition 68, for example, may specify an additional template disposition 68. The NO_ACTION template disposition 68, for example, may not be combined with other template dispositions 68. A template instance 86 with the CANCEL_INSTANCE template disposition, as another example, may not specify an additional template disposition 68. The CANCEL_INSTANCE template disposition 68, as another example, may not be combined with other template disposition 68. The CANCEL_INSTANCE template disposition 68, as yet another example, may not target either itself nor another template 60 with the CANCEL_INSTANCE template disposition 68. An attempt to do so may be treated as a no-operation by the endpoint detection agent 40. The CANCEL_INSTANCE template disposition 68, as yet another example, may not target another template with the NO_ACTION template disposition 68. An attempt to do so may be treated as a no-op by the endpoint detection agent 40. The CANCEL_INSTANCE template disposition 68, as still another example, may not target a template instance 86 of a different type 88. An attempt to do so may be treated as a no-op by the endpoint detection agent 40.

Templates 60 with the template scopes 80 may be combined with the template disposition 68. For example, the NO_ACTION template disposition 68, and/or the CANCEL_INSTANCE template disposition 68, when combined with the template scope 80, provide ways to turn off either one specific template instance 86 or all template instances 86 of a given type 88 for a given input stream. Combined with template scopes 80, these template dispositions 68 can be used to turn on or turn off specific behavior for specific users, customers, and/or devices.

Still more examples of other template dispositions 68 are provided. The NO_ACTION template disposition 68, for example, tells the endpoint detection agent 40 that if the instance 86 is a match, no other template disposition action will be taken within that template scope or scopes 80 of lower priority. Because the template scope 80 sets priority (e.g., as explained with reference to FIG. 2), the NO_ACTION template disposition 68 in the template scope 80 would mean no matches would happen ever. The NO_ACTION template disposition 68 in the template scope 80 would mean all matches in template scopes 80 would still happen, but instances 86 would not match. This prioritization, for example, reflects a special case for "break glass" situations where it is desired to have every user/customer/device have exactly the same reaction to a situation and not need to think about intersecting match rules 64. However, the general idea is that the more specific rule should win.

Consider, as another example, a common software kill or terminate situation. Suppose the user 50 wishes to abort a software with CommandLine oftenevil.exe, as this software application 32 is known malicious. The user 50 may thus configure the template instance 86 with the template disposition 68 of "kill." Suppose further, though, that a customer ("ABC") uses this software application 30 for legitimate purposes, and the customer ABC wants to be able to run oftenevil.exe without issue. The user 50 may thus write a customer template instance 86 for the customer ID (associated with ABC) which specifies the NO_ACTION template disposition 68 when CommandLine~=oftenevil.exe. For every other customer, though, the kernel process will be terminated or not initiated, but because the Customer template scope 80 wins out, the ABC customer can continue using this software.

Still another example is provided. Suppose a standard software driver (such as DeviceDriver) is never to be blocked, so the user 50 sets the Global NO_ACTION template instance 86 for DeviceDriver. However, a specific customer (such as ACME) has its own custom driver for its devices, so customer ACME never wants DeviceDriver to run. The user 50 may thus write a customer-specific template instance 86 that blocks DeviceDriver for all of ACME's users and/or devices. Because it is in the Customer template scope 80, it doesn't impact other customers and is higher priority than the NO_ACTION in Global scope 80. Other customers have the NO_ACTION, and ACME doesn't let that driver run.

Another example is the CANCEL_INSTANCE template disposition 68. The CANCEL_INSTANCE template disposition 68 causes the endpoint detection agent 40 to cancel or ignore a match on a different template instance 86. The target instance 86 (e.g., the template instance 86 which will be canceled or ignored) is specified by a template instance ID. The target instance 86 may be within the same template scope 80 or a scope 80 of lower priority. The user 50 may specify a list of target instance IDs which will be cancelled or ignored.

Yet another example is an Analysis template disposition 68. The Analysis template disposition 68 instructs or causes the endpoint detection agent 40 to cloud report data, information, or other telemetry about the instance 86 which matched. The Analysis template disposition 68 may not require parameters.

Yet another example is an Associate_Pattern template disposition 68. The Associate_Pattern template disposition 68 instructs or causes the endpoint detection agent 40 to associate a pattern 162 with the kernel process 164 that triggered the input event 20 which matched. The content author (e.g., the user 50) may specify a pattern ID to associate. A list of pattern IDs (i.e., more than one pattern ID) can be associated. For each pattern 162, the content author must specify a pattern handling, such as shown in the below table.

| Pattern Handling | Semantics |
|---|---|
| MICROBEHAVIOR | Sensor should associate the pattern on the sensor but otherwise generate no clouded telemetry |
| INDICATOR | Sensor should associate the pattern as an indicator & emit a cloudable indicator event |
| DETECT | Sensor should associate the pattern as a detect & emit a cloudable detection event |

The Associate_Pattern template disposition 68 can be combined with other template dispositions 68. If the disposition is detect-only (such as a Kill_Process, as below explained)), then it must be combined as a detect.

Another example is a Kill_Process template disposition 68. The Kill_Process template disposition 68 instructs or causes the endpoint detection agent 40 to kill the process 164 which triggered the input event 20 and/or an ancestor process 164 (such as a calling/invoking parent or grandparent process 164). In order to use the Kill_Process template disposition 68, the content author must have also specified the Associate_Pattern template disposition 68 with a DETECT pattern handling. When this template disposition 68 is selected, the content author can tell the endpoint detection agent 40 to kill the process 164 which triggered the input event 20; the parent of that process 164; its grandparent; or a combination of the above.

The template dispositions 68 may have configurable/selectable parameters and attributes. A graphical user interface, for example, may be generated to visually present a list of the template dispositions 68 and their corresponding configuration parameters and attributes. The configuration parameters and attributes indicate how the template dispositions 68 may be combined or used on a template instance 86. A mutually-exclusive=yes, for example, may mean that the selected template disposition 68 is only valid on its own. A template instance 86 that defines this disposition 68, in other words, may not define others. A repeatable=yes means that the same template disposition 68 can be defined multiple times in the same template instance 86 (for example, the user 50 may associate multiple patterns 162 as part of a single template instance definition). Doing so would require that the Associate_Pattern template disposition 68 be configured twice (with different PatternId values on each). A requires-detect=yes means that the template disposition 68 can only be configured if the user 50 has also/already configured the Associate_Pattern template disposition 68 and specified pattern_handling=DETECT.

Figure 6:
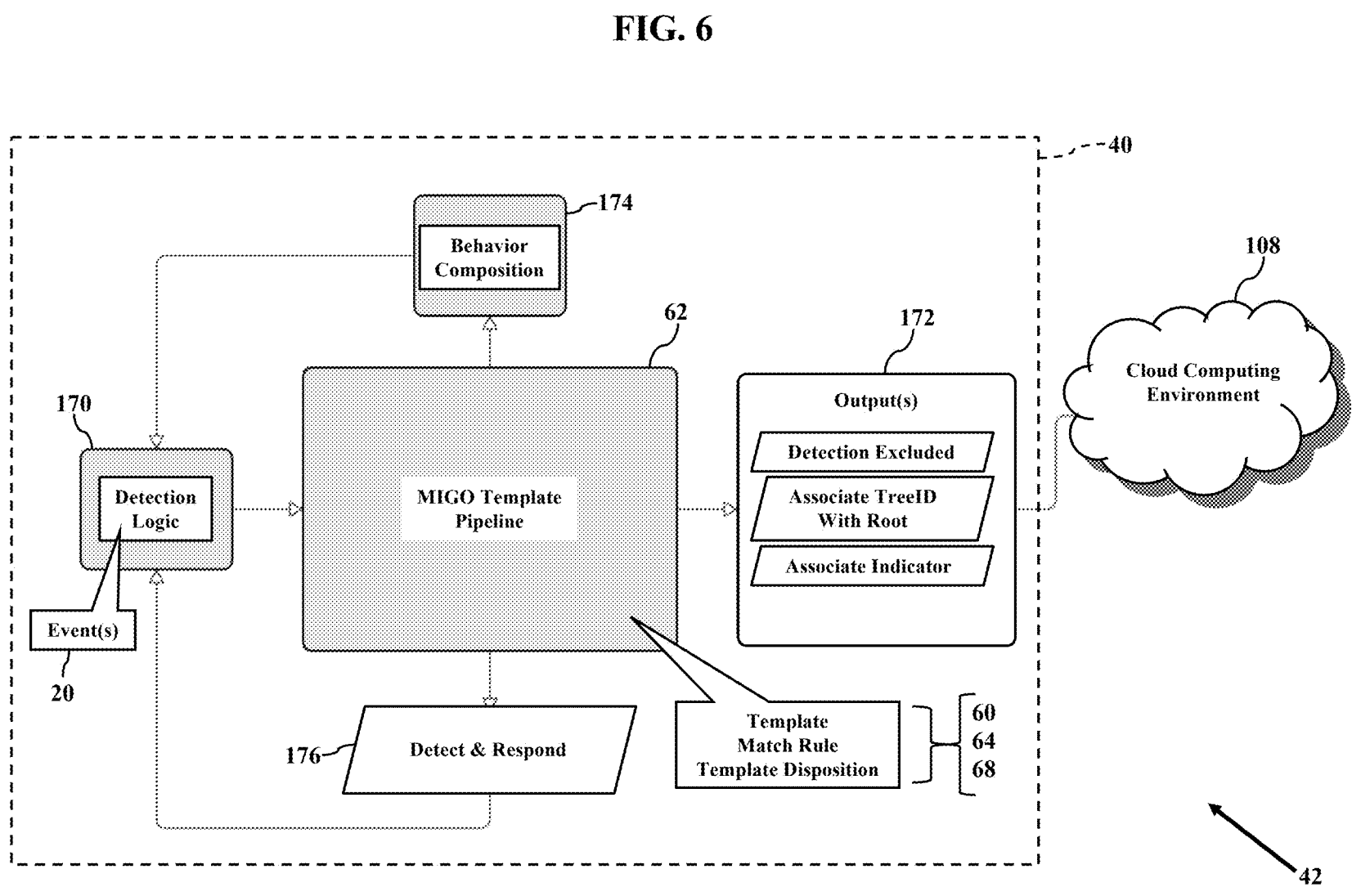
Figure 7:
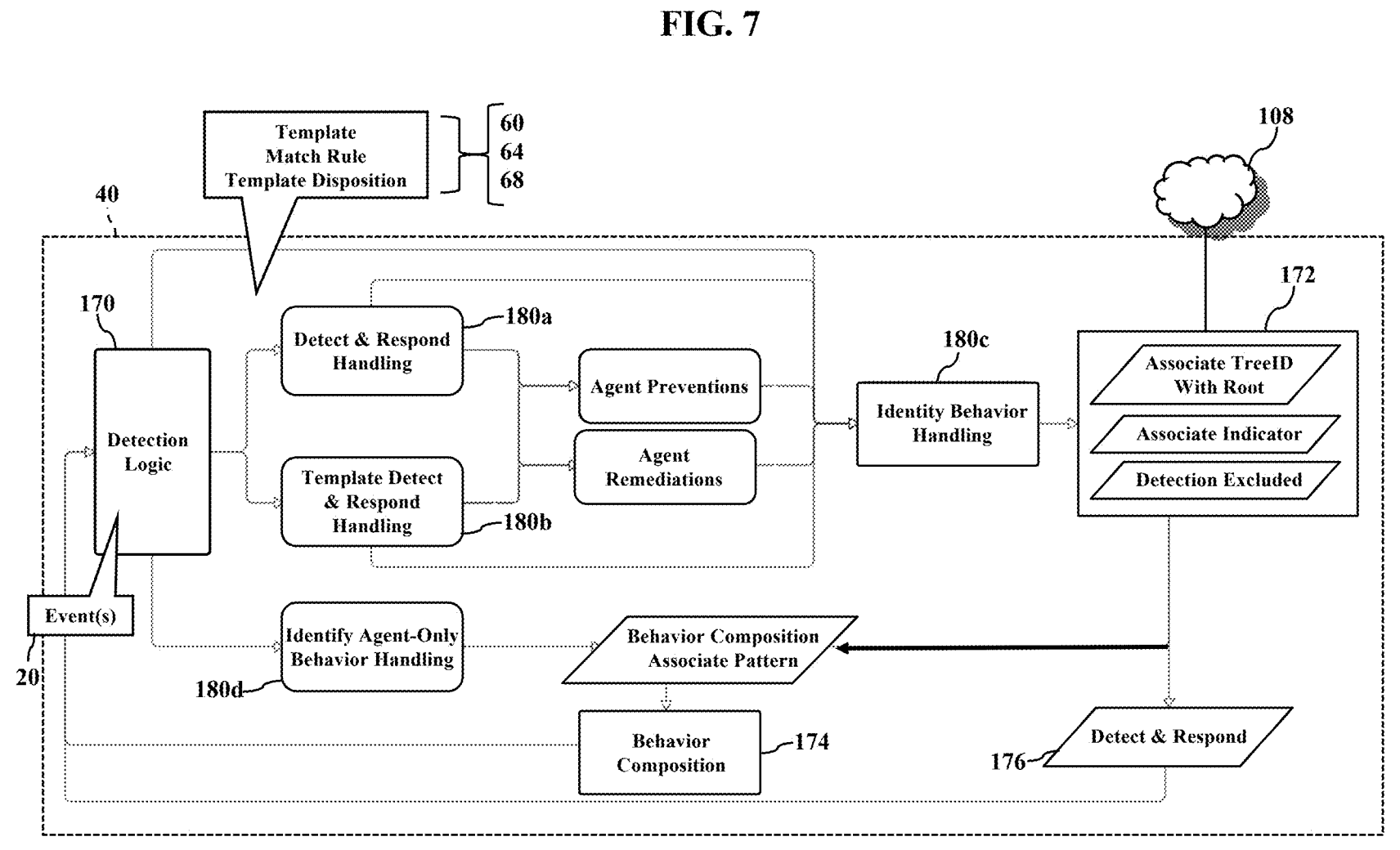
Figure 8:
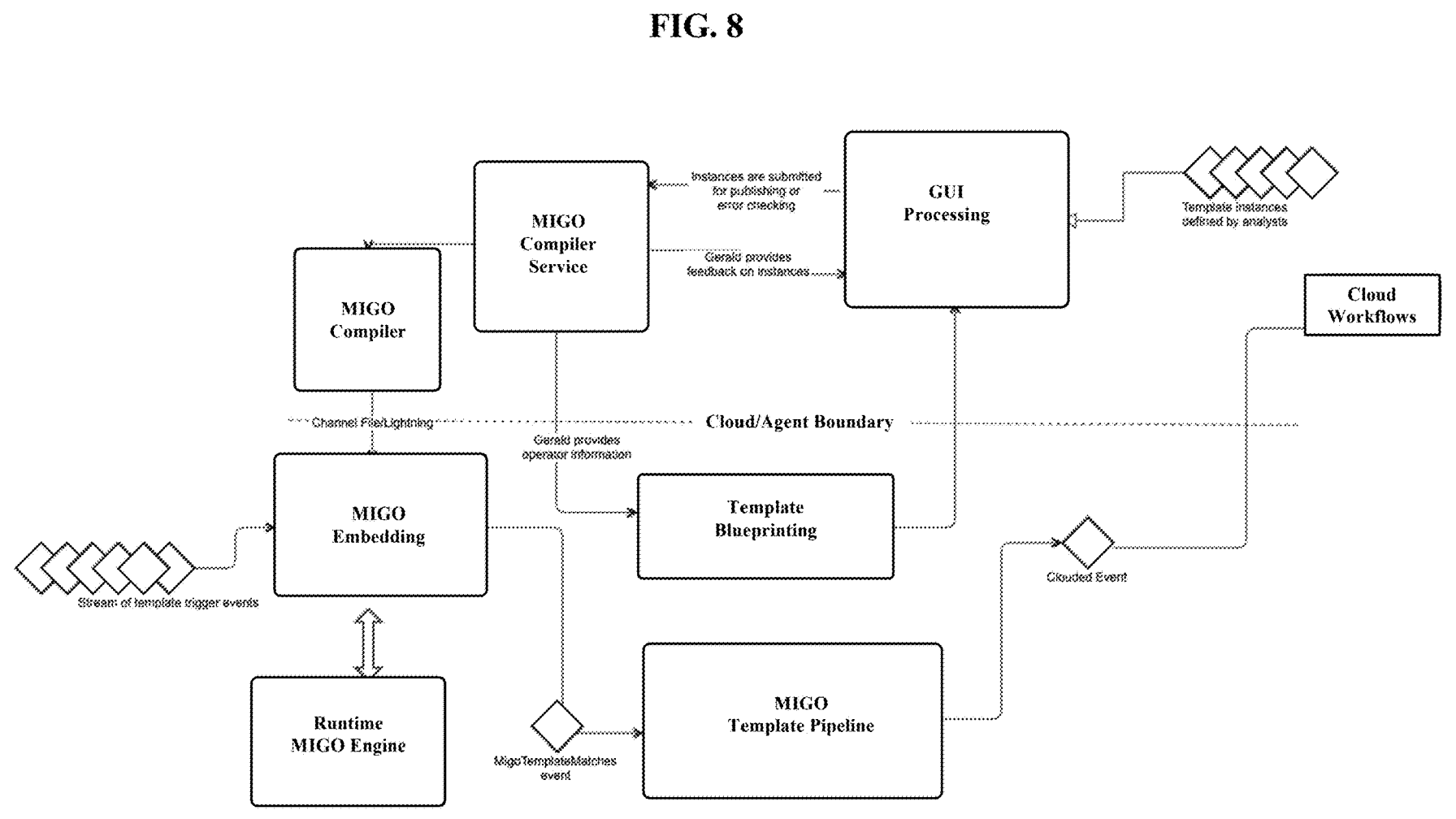

FIGS. 6-8 illustrate still more examples of templates 60 and the MIGO template pipeline 62. FIG. 6 illustrates componentry associated with the endpoint detection agent 40. FIG. 7 illustrates more detailed componentry associated with the endpoint detection agent 40. FIG. 8 illustrates an architectural diagram of the event monitoring and detection service 42. The endpoint detection agent 40 communicates via a communications network (not shown for simplicity) with the cloud computing environment 108. The endpoint detection agent 40 may cooperate with the cloud computing environment 108, perhaps in a client/server relationship, to provide the event detection service 42. The endpoint detection agent 40 incorporates the MIGO template pipeline 62 as one of multiple logical components that detect and process the events 20. The MIGO pipeline 62 may be applied to a scheme or use case that responds to detected events 20. The endpoint detection agent 40, for example, may read the template 60 and identify the event(s) 20 of interest specified by the template 60. The endpoint detection agent 40 may cooperate with the operating system 24 (as previously explained with reference to FIGS. 1-5) to establish kernel event notifications regarding the event(s) 20 of interest specified by the template 60. The endpoint detection agent 40 may configure detection logic 170 as one or more inputs to the MIGO template pipeline 62. The detection logic 170 thus monitors the events 20 reported by the operating system 24 to the endpoint detection agent 40. The detection logic 170 compares the events 20 to logical inputs rules specifying entry inputs to the MIGO template pipeline 62. When the detection logic 170 determines that an event or events 20 satisfies/satisfy or matches event(s) 20 of interest specified by the template 60, then the detection logic 170 feeds, sends, or inputs the event(s) 20 of interest to the MIGO template pipeline 62. The MIGO template pipeline 62 executes the corresponding match rule(s) 64 specified by the template 60. The MIGO template pipeline 62 may then generate one or more outputs 172 (such as Detection Excluded, Associate TreeID with Root, and/or Associate Indicator, as later paragraphs will explain).

Remote notification may also be performed. If the template 60 specifies, for example, the endpoint detection agent 40 may notify the cloud computing environment 108 of the event(s) 20, the template 60, and the resulting template disposition 68. Moreover, the event 20, the template 60, and/or the template disposition 68 may be input as feedback for a behavior composition 174 and a detect & respond result 176 that drives further improvements, learning, or modifications to the detection logic 170. Because the event(s) 20 of interest has/have been detected, the detection logic 170 may further alert or notify the endpoint detection agent 40. The endpoint detection agent 40 may then interface with the operating system 24 and instruct the operating system 24 to suspend/halt/stall/stop processing of the event 20. The endpoint detection agent 40, the template pipeline 62, and/or the cloud computing environment 108 may thus process the event(s) 20 of interest and determine the template disposition 68. The endpoint detection agent 40 may then instruct the operating system 24 to resume processing of the event(s) 20, or to terminate the event(s), or to implement other operations or actions depending on the template disposition 68.

Generic processing may be implemented. The detection logic 170 detects the events 20 of interest, as specified by the template 60. The detection logic 170 may decide that a given behavior or artifact (such as performed on the host computer system 22 illustrated in FIGS. 1-5) matches the match rule(s) 64 associated with the template 60. The match rules 64, for example, may describe particular events 20 of interest, normal/abnormal events 20, malicious/safe sequences of events 20, or other representation of a desired event detection. Whatever the match rules 64 specify, when the detection logic 170 determines a match with any one or more match rules 64, then the detection logic 170 may broadly or generally categorize and process the match. While a category and processing may be implemented, and while as many categories and processes as desired may be implemented, FIG. 7 illustrates as four (4) generic processes 180*a-d*. Each event or events 20 that satisfy any match rule(s) 64 may be categorized, routed, and/or processed as one (1) or more of the following four (4) generic processes 180*a-d:*

Detect & Respond processing;
Template Detect &Respond processing;
Identify Behavior processing; and/or
Identify Agent-Only Behavior processing.

These generic processes 180*a-d* may be effectively thought of as entry-points into the template pipeline 62. The handling defined for each of these different generic processes 180*a-d* (and downstream events thereafter) implements the core plumbing required to process event detections, whether on the endpoint detection agent 40 and/or uploaded through to the cloud computing environment 108. The MIGO template pipeline 62 may interact with other pipelines on the endpoint detection agent 40, as there may be an inherent relationship between detection, prevention and remediation. The processing pipelines for prevention and remediation, though, are each large concepts that are distinct from the MIGO template pipeline 62, so these pipelines for prevention and remediation are not illustrated and need not be explained in detail.

The MIGO template pipeline 62 may also execute the Detect and Respond process 176. The Detect and Respond process 176 serves as a completion for the MIGO template pipeline 62. The Detect and Respond process 176 may or may not be clouded and is intended to be handled within the endpoint detection agent 40 to allow config logic to reason over the results of the MIGO template pipeline 62 processing. More concretely, detection developers may want to know what happened within the MIGO template pipeline 62 in order to drive subsequent detection logic. Detection developers can accomplish this by handling Detect and Respond process 176 and reasoning over a PatternDisposition field.

The endpoint detection agent 40 monitors the events 20 associated with the operating system 24. The endpoint detection agent 40 compares a single event 20, or a sequence of multiple events 20, to the match rule 64 associated with the template 60. If the event/events 20 match, comply with, equal, or otherwise satisfy the match rule 64, then the MIGO template pipeline 62 (as a component of the endpoint detection agent 40) determines and executes the template disposition 68 specified by the template 60. The template 60 may have programming, instructions, or match rule 64 that causes the endpoint detection agent 40 to notify the cloud computing environment 108 of the event/events 20 satisfying the match rule 64. associated with the template. The MIGO template pipeline 62 may identify the computer behavior (using the Behavior Composition 174) associated with the event/events 20. The MIGO template pipeline 62 may determine an event remediation specified by the template 60. The endpoint detection agent 40 may block the process 164 associated with the event(s) 20. The endpoint detection agent 40 may designate the event(s) 20 for an exclusion according to the template 60.

FIGS. 9-14 illustrate more examples of the Identify Behavior generic process 180c. FIG. 9 illustrates examples of exclusions that are supported for the MICROSOFT WINDOWS® operating system 24. FIG. 10 illustrates examples of patterns 162 that are supported for the MICROSOFT WINDOWS® operating system 24. FIGS. 11-12 similarly illustrate process handling examples of the Identify Behavior generic process 180c for when the operating system 24 is a version of APPLE MACOS®. FIGS. 13-14 similarly illustrate process handling examples of the Identify Behavior generic process 180c for when the operating system 24 is a version of LINUX®.

The Identify Behavior generic process 180c determines an association between the kernel/software process 164 and a hardware/software behavior. As the host computer system 22 executes the operating system 24, the operating system 24 may initiate and execute one of the software applications 32 as the process 164. Inputs to the MIGO template pipeline 62 may be generically categorized as the Identify Behavior generic process 180c. Indeed, most inputs to the MIGO template pipeline 62 will at some point route to (and through) the processing componentry representing the Identify Behavior generic process 180c (as FIG. 9 illustrates). As an example, suppose the endpoint detection agent 40 determines a TargetProcessId associated with the process 164. The endpoint detection agent 40 may receive the TargetProcessId from the operating system 24 (such as the kernel 48). The endpoint detection agent 40 may additionally or alternatively determine the TargetProcessId by querying the event ontology 132. Suppose also that the endpoint detection agent 40 determines a PatternId associated with the events 20. Multiple events 20 may represent a pattern 162, and the pattern 162 has the unique PatternID. The behavior of the computer system 22 (identified by the PatternId) is associated with a particular process 164 (identified by the Target-ProcessId). The job of the Identify Behavior generic process 180c is to figure out exactly what type of association should occur between the process 164 and the behavior. In order to determine the association between the process 164 and pattern-based behavior, the Identify Behavior generic process 180c may determine answers high-level logical questions. One such question, for example, may be 1) is this process 164 excluded from detection for this particular behavior? Another question may be 2) what is the configuration (or process handling) for this particular pattern? Indeed, the Identify Behavior generic process 180c may determine many more related and/or different logical outcomes in order to determine a result. As more examples, there may be several types of exclusions that may apply, and these exclusions may require more logical paths, outcomes, and results. Some events 20, as yet more examples, may be excluded from visibility, white/black listed, allowed/disallowed/impermissible, or other configuration or permission. The list of sub-questions to ask (and to answer) may vary by platform (because not all platforms support the same capabilities), but all-in-all the intent is to answer a broader exclusion question.

Figuring out what the configuration/handling is for a particular pattern is not a trivial task. Pattern configuration is dynamic and can be defined from multiple (distinct) sources with different template scopes 80 and precedence/order 92. Therefore, figuring out the correct handling for a given pattern 162 involves incorporating all the relevant source information and applying that source information in the correct order and precedence 92.

Returning to FIG. 7, once the logical questions/processing are sufficiently answered, the Identify Behavior generic process 180c may generally result in one of the following completion actions (e.g., the output 172):

Detection Excluded—a detection exclusion applied;

Associate TreeId—no exclusion applied, the pattern 162 is configured as a detect; and Associate Indicator—no exclusion applied, the pattern 162 is configured as an indicator.

If an error occurred, or if something went wrong, the Identify Behavior generic process 180c may indicate the error (such as PatternHandlingError). Moreover, the Identify Behavior generic process 180c may do nothing, such as perhaps a service visibility exclusion (or SVE) applied to the process 164.

FIGS. 15-24 illustrate examples of the Detect & Respond generic process 180a (as previously explained with reference to FIG. 7). FIG. 15 illustrates examples of exclusions that are supported for the MICROSOFT WINDOWS® operating system 24. FIG. 16 illustrates examples of responsive actions (e.g., the output 172) that are supported for the MICROSOFT WINDOWS® operating system 24. FIGS. 17-21 similarly illustrate process handling examples of the Identify Behavior generic process 180a for when the operating system 24 is a version of APPLE MACOS®. FIGS. 22-24 similarly illustrate process handling examples of the Identify Behavior generic process 180a for when the operating system 24 is a version of LINUX®.

The Detect & Respond generic process 180a specifies responsive actions implemented by the endpoint detection agent 40. The responsive actions (e.g., the output 172) are actions that the endpoint detection agent 40 takes on the host computer system 22, in response to a particular detection event 20. The particular actions taken may vary depending on the context 70 of the detection itself. In order to apply the correct (and expected) actions, the Detect & Respond generic process 180a attempts to answer several high-level questions, such as:

1) Is this process 164 excluded from detection for this particular behavior?

2) What is the configuration (or handling) for this particular pattern 162?

3) Does customer Policy allow response actions to be taken for this particular detection?

4) What are the response actions associated with this particular detection?

The reader may notice that the first two questions on this list are the same two questions that the Identify Behavior generic process 180c also posed and answered (as explained with reference to FIGS. 7 & 9-14). Thus, it can be correctly inferred that the Identify Behavior generic process 180c and the Detect & Respond generic process 180a may overlap and duplicate functionality. Before the endpoint detection agent 40 attempts to take detection response actions on the host computer system 22, the Detect & Respond generic process 180a may ensure that relevant policy system tags are set. This policy check may be a priority mechanism, as the implementation of a customer/client/service policy decision may be required to remain true. That is, the endpoint detection agent 40 may be configured to never take detection response actions on the hosting computer system 22 unless specifically allowed by customer/client/service policy. The customer, for example, may enable or disable particular response actions allowed on their network environment and hosts via user interface Policy Toggles. Those toggles map to particular policy system tags which are themselves inherently tied to particular capabilities and response actions the endpoint detection agent 40 may take. Thus, it may be the customer who ultimately decides which particular path the Detect & Respond generic process 180a logic will take-through UI toggles, which are mapped to Policy System tags and evaluated in the Detect & Respond generic process 180a at the time a detection fires.

Aside from Policy, the response actions available may depend on the context 70. A detection of the event/events 20 of interest, the associated pattern 162, and the associated process 164 related to the context 70 and device behavior. The list of response actions continues to grow over time, but the list of response actions may include actions such as block the process 164, kill/terminate the process 164, and block an operation associated with the event 20, the process 164, the software application 32, and the operating system 24.

Finally, once the questions above are sufficiently answered, the Detect & Respond generic process 180a will proceed with applying those actions, either by rolling up events 20 that hand execution off to other pipelines (such as a Process Prevention Pipeline and/or a Remediation Pipeline, not shown for simplicity) or by continuing execution through the Detect & Respond generic process 180a by rolling up an Identify Behavior event and handing off execution to the Identify Behavior generic process 180c (as above described with reference to FIGS. 7 & 9-14).

Figure 25:
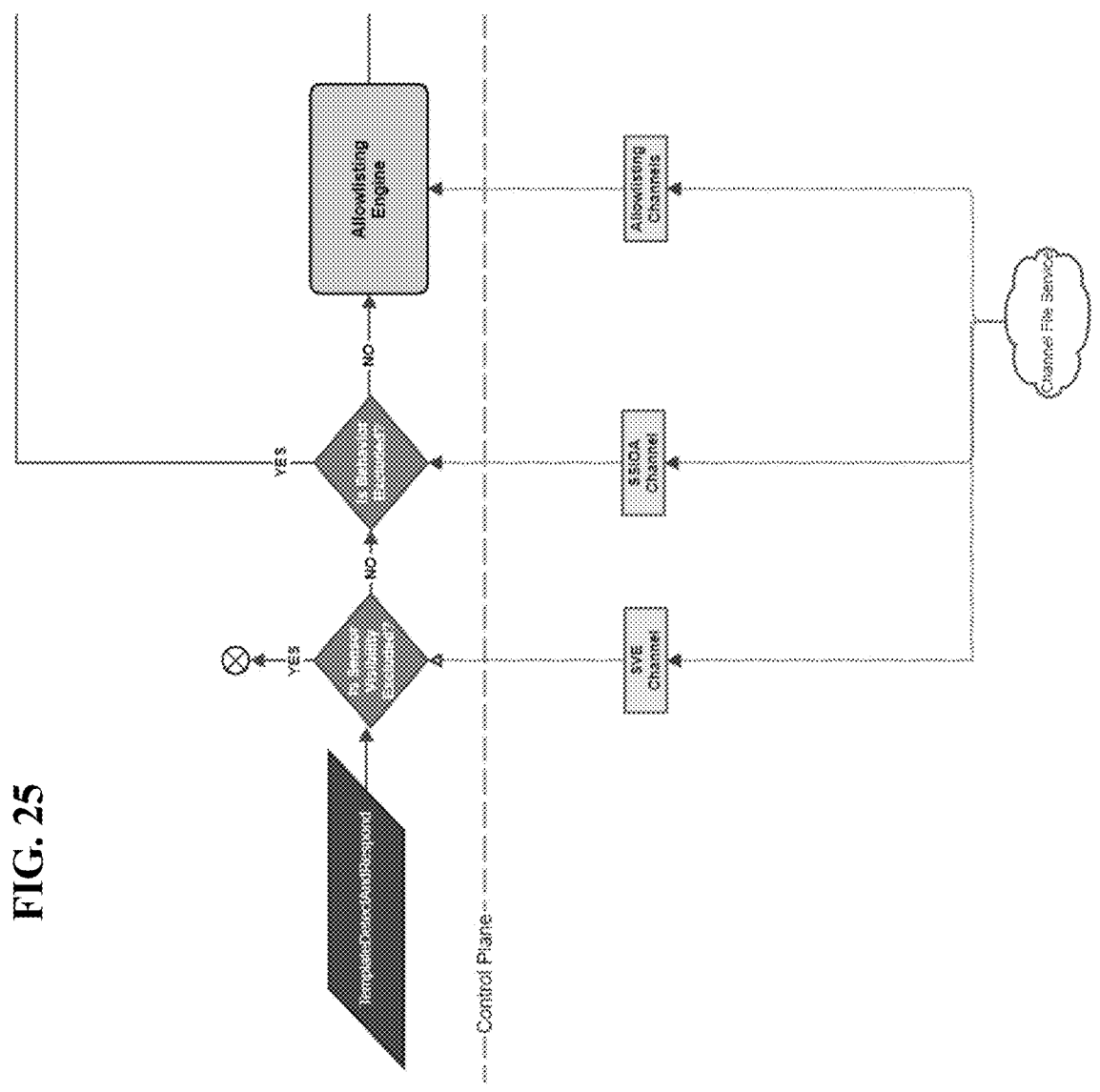
Figure 26:
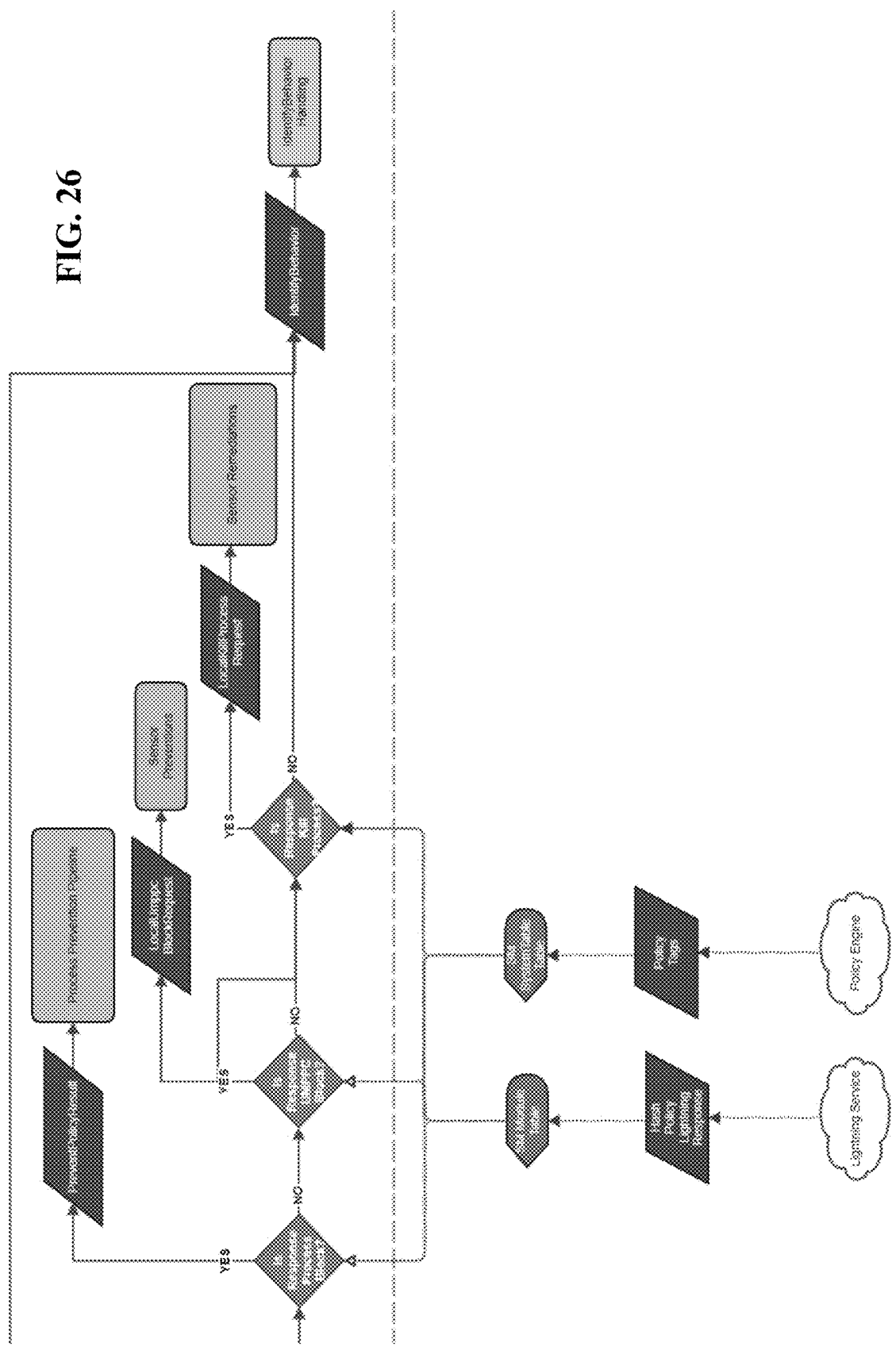

FIGS. 25-35 illustrate examples of the Template Detect & Respond generic process 180b (illustrated in FIG. 7). FIGS. 25-26 illustrate process handling examples of the Template Detect & Respond generic process 180b for when the operating system 24 is a version of MICROSOFT WINDOWS®. FIG. 27 illustrates examples of exclusions that are supported for the MICROSOFT WINDOWS® operating system 24. FIGS. 28-30 illustrate examples of responsive actions (e.g., the output 172) that are supported for the MICROSOFT WINDOWS® operating system 24. FIGS. 31-35 similarly illustrate process handling examples of the Identify Behavior generic process 180c for when the operating system 24 is a version of APPLE MACOS®. The Template Detect & Respond generic process 180b also supports a version of LINUX® operating system 24. Events 20 detected using the LINUX® operating system 24 may be routed and processed as inputs to the Identify Behavior generic process 180c and the Detect & Respond generic process 164b (as this disclosure above explains).

Figure 36:
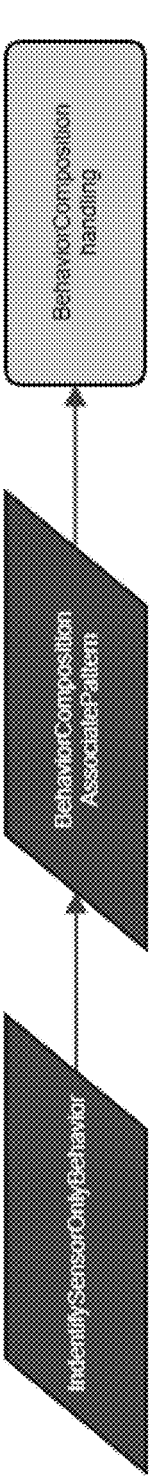
FIG. 36 illustrates examples of an Identify Agent-Only Behavior generic process.

FIG. 36 illustrates examples of the Identify Agent-Only Behavior generic process 180d (illustrated in FIG. 7). The Identify Agent-Only Behavior generic process 180d associates the pattern 162 with the process 164. As the name implies, though, this association between the pattern 162 and the process 164 may be executed solely by the endpoint detection agent 40. The Identify Agent-Only Behavior generic process 180d may thus be not permitted to send, report, or convey an event detection to the cloud computing environment 108 (the other generic processes 180a-c, though, may report their detected events 20, process 164, pattern 162, and template dispositions 68 to the cloud computing environment 108). The primary purpose of the Identify Agent-Only Behavior generic process 180d may be to implement microbehaviors, and these microbehaviors may be made available for analysis in the cloud computing environment 108 via an EndOfProcess event description. Microbehaviors may also be used to drive subsequent detections on the endpoint detection agent 40 via the Behavior Composition 174 capability. The primary motivation for splitting out Microbehavior handling into a distinct event with distinct handling is to realize performance optimizations. Namely, the Identify Agent-Only Behavior generic process 180d handling may not bother with checking for exclusions nor pattern handling configurations. Because of this optimized path, the Identify Agent-Only Behavior generic process 180d is very simple and may require only minimal hardware/software and electrical power resources in the host computer system 22. Minimum work may thus be performed in order to associate the pattern 162 with the particular process 164. In practice this corresponds to routing this event to the Behavior Composition 174 component.

FIGS. 37-47 illustrate examples of the outputs 172 (illustrated in FIG. 6) generated by the MIGO template pipeline 62. FIGS. 37-38, for example, illustrate the Detection Excluded output 172. The Detection Excluded output 172, for example, is executed or rolled up by the endpoint detection agent 40 (such as the Identify Behavior generic process 180c illustrated in FIGS. 7 & 9-14) whenever a detection exclusion has been applied for a particular pattern 162 and process 164. Even though the event(s) may be categorized or processed as the Detection Excluded output 172, the event(s) and/or the Detection Excluded output 172 metadata may be dispatched to a ProcessBehaviorComposition (PBC) component (such as 174 illustrated in FIG. 7). That is, even though the event detection is excluded, the event 20 may still be analyzed and processed for other purposes (such as behavioral analysis). Nevertheless, the behavior defined by the pattern ID occurred and can still be associated with the process 164 (even if the detection itself was excluded). That behavior/pattern association can be used later on to drive downstream detections via Behavior Composition 174 capability. As FIG. 39 illustrates, detection exclusions (that generate DetectionExcluded events) may be defined via a variety of source mechanisms. The endpoint detection agent 40 may report the event 20 and/or the Detection Excluded output 172 to the cloud computing environment 108. This cloud notification informs the cloud computing environment 108, and/or downstream clients, that a particular exclusion was applied to a would-be detection. This event 20 is bounded by the process 164 and pattern ID via generalized bounding according to the ontology 132.

Figure 40:
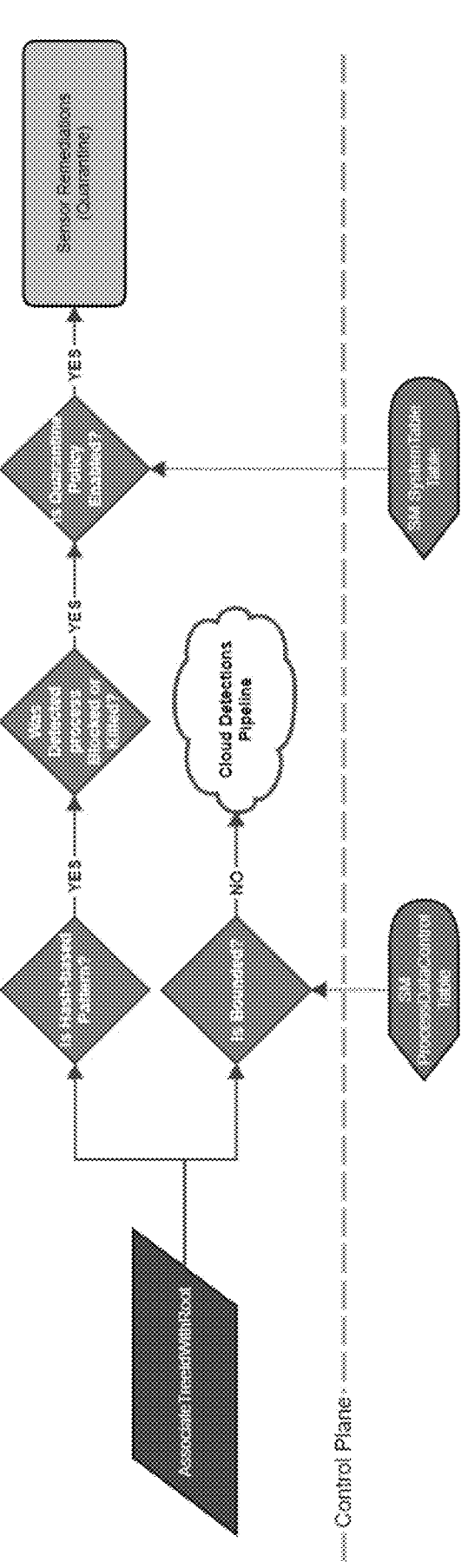

FIG. 40 illustrates examples of an Associate TreeID as the output 172 (illustrated in FIG. 7). The Associate TreeID is rolled up and executed by the MIGO template pipeline 62 whenever the behavior has been associated with a particular process 164 and the relevant pattern 162 is configured as a Detect. Detections may identify suspicious or malicious behaviors on the host computer system 22, and as such they have impact both on the endpoint detection agent 40 and in the cloud computing environment 108. On the endpoint detection agent 40, the Associate TreeID will associate the process 164 with a detection tree (either by associating with an existing tree, or by rooting a new detect tree). The endpoint detection agent 40 uses the fact that a process 164 is (or is not) linked to a detect tree to make decisions regarding the particular process 164. For example, once a process 164 has been linked to a detect tree, the endpoint detection agent 40 may unbound and cloud the event(s) 20 associated with a detect tree that would have otherwise not been clouded. The graphical user interface 100 may be driven by clouded Associate TreeID events 20. The primary task of Associate TreeID handling logic is to figure out whether or not to cloud the Associate TreeID event. The event 20 is clouded and bounded (via generalized bounding) according to its ontology 132.

Figure 42:
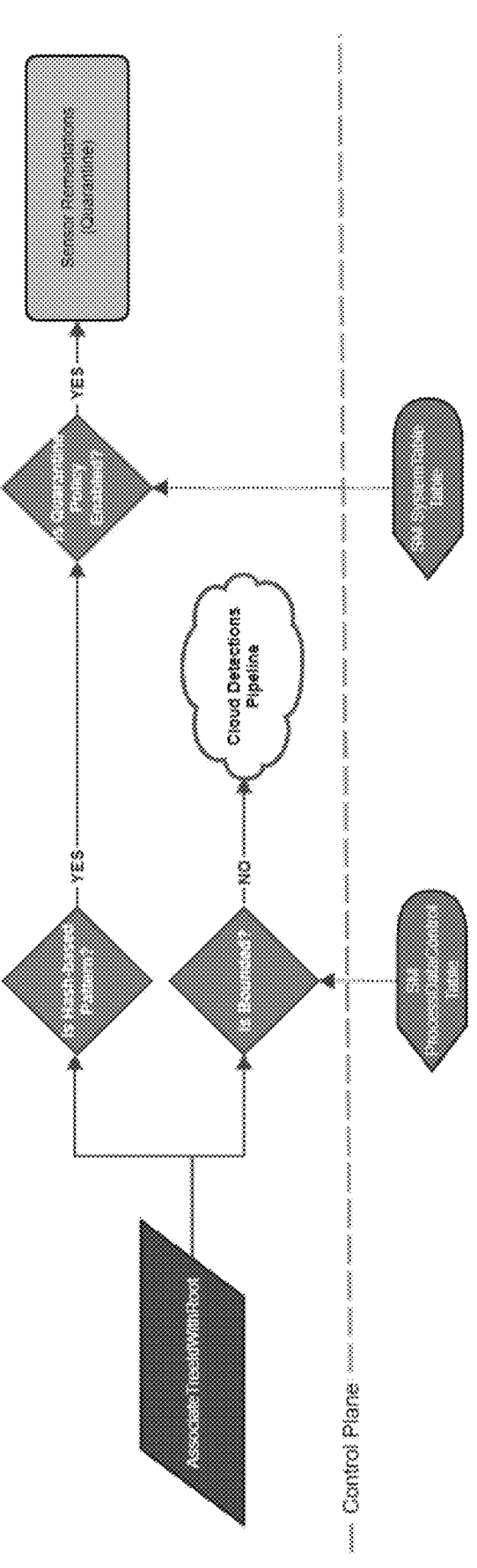
Figure 44:
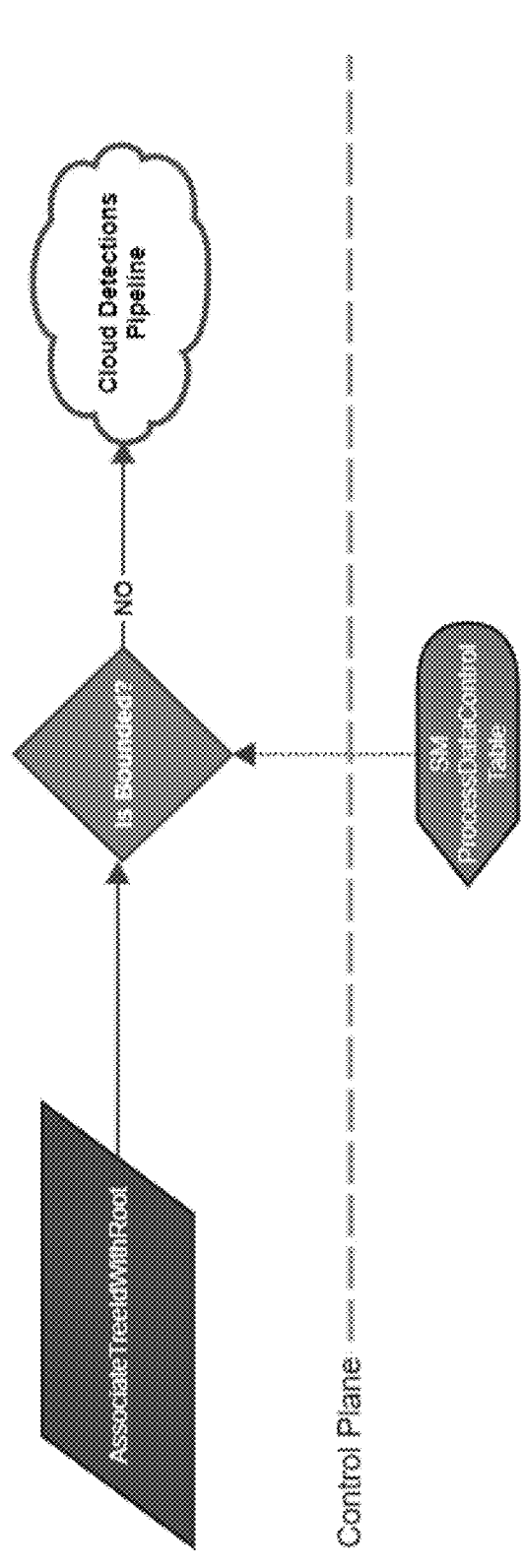
Figure 46:
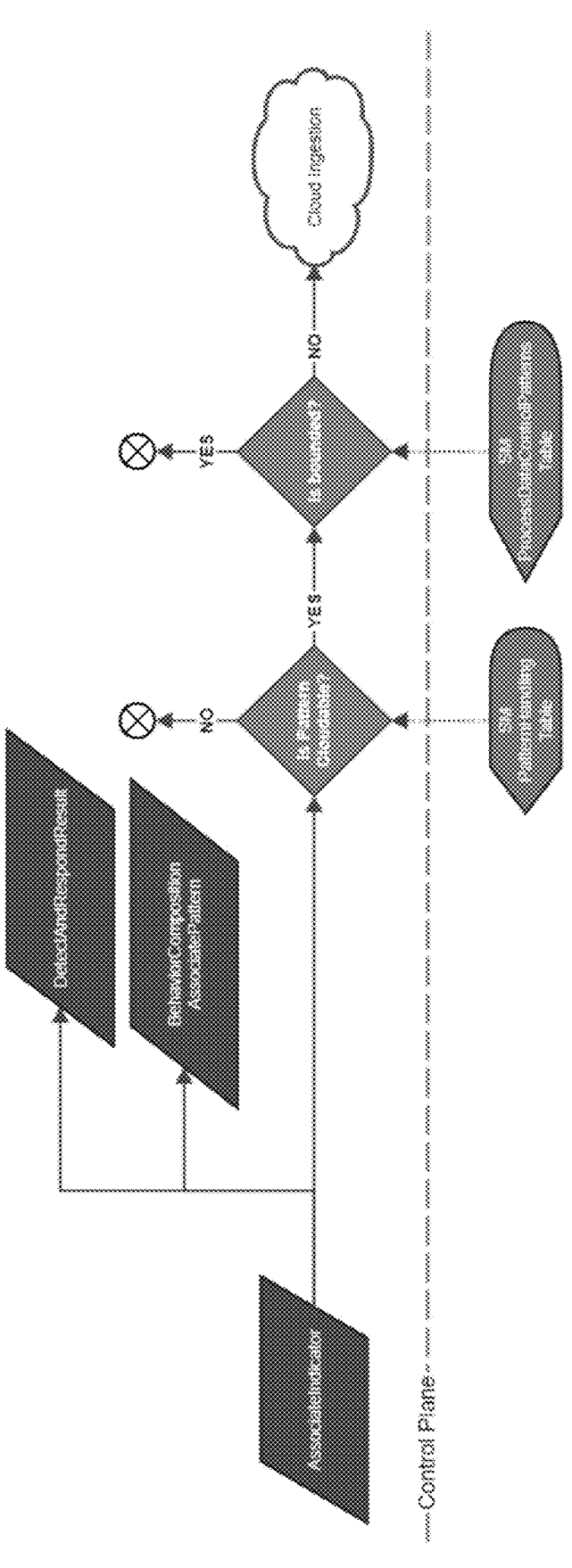

FIGS. 41-46 illustrate examples of the Associate TreeID with Root output 172 (illustrated in FIG. 7). FIG. 41 illustrates process handling examples of the Associate TreeID with Root output 172 for when the operating system 24 is a version of MICROSOFT WINDOWS®. FIG. 42 illustrates examples of cloud reporting for the MICROSOFT WINDOWS® operating system 24. FIGS. 43-44 similarly illustrates process handling examples of the Associate TreeID with Root output 172 for when the operating system 24 is a version of APPLE MACOS®. FIGS. 45-46 similarly illustrates process handling examples of the Associate TreeID with Root output 172 for when the operating system 24 is a version of LINUX® operating system 24. The Associate TreeID and the Associate TreeID with Root output 172 are rolled up and executed by the MIGO template pipeline 62 whenever a behavior has been associated with a particular process 164 and the relevant pattern 162 is configured as a Detect. Detections are intended identify suspicious or malicious behaviors on the host computer system 22, and as such they have impact both on the endpoint detection agent 40 and in the cloud computing environment 108. On the endpoint detection agent 40, the Associate TreeID with Root output 172 will associate the process 164 with a detection tree (either by associating with an existing tree, or by rooting a new detect tree). The endpoint detection agent 40 uses the fact that a process 164 is (or is not) linked to a detect tree to make decisions regarding the particular process 164. For example, once a process 164 has been linked to a detect tree, the endpoint detection agent 40 may unbound and cloud events 20 associated with a detect tree that would have otherwise not been clouded. The graphical user interface 100 is driven by clouded Associate TreeID with Root output 172 events. The primary task of Associate TreeID with Root output 172 handling logic is to figure out whether or not to cloud the Associate TreeID with Root output 172 event. The Associate TreeID with Root output 172 event 20 is clouded and bounded (via generalized bounding) according to the ontology 132. The Associate TreeID with Root output 172 is routed to remediations logic if the detect PatternId ID corresponds to a hash-based pattern 162 (i.e., machine learning blocklist or customer blocklist) and if a quarantine system policy tag is set. Execution may be handed off to remediations, which is a distinct logical component that interacts with the MIGO template pipeline 62. The Associate TreeID with Root output 172 may be dispatched to the ProcessBehaviorComposition (PBC) component (such as 174 illustrated in FIGS. 6-7). That behavior/pattern association can be used later on to drive downstream detections via the Behavior Composition 174 capability.

FIG. 52 illustrates examples of the Associate Indicator output 172 (illustrated in FIG. 7). The Associate Indicator output 172 is rolled up and executed by the MIGO template pipeline 62 whenever the behavioral pattern 162 has been associated with a particular process 164 and the relevant pattern 162 is configured as an indicator. Indicators may identify interesting (or even suspicious) behaviors on the host computer system 22, but do not meet the bar for a detection. Thus, indicators do not root tree IDs on the endpoint detection agent 40 (such as, for example, the way that the Associate TreeID with Root output 172 handling does) nor do they show up in the graphical user interface 100. With that said, indicators may still be interesting enough to cloud and to drive cloud processing and analysis. The primary task of Associate Indicator output 172 handling logic is to figure out whether or not to cloud the event 20. The event 20 processed by the Associate Indicator output 172 may be sent to the cloud computing environment 108 and bounded (via generalized bounding) according to the ontology 132. The event 20 processed by the Associate Indicator output 172 is dispatched for process behavior analysis (such as to the Process Behavior Composition 174). That behavior/pattern association can be used later on to drive downstream detections via the Behavior Composition 174 capability.

FIG. 48 illustrates more examples of the Detect and Respond process 176. The MIGO template pipeline 62 executes the Detect and Respond process 176 as a completion event. In FIG. 48, the Detect and Respond process 176 specifies a blocking responsive action to take. The MIGO template pipeline 62 initiates a blocking event action after checking for exclusions and verifying customer policy settings. In the case where the endpoint detection agent 40 successfully applies the blocking event action, a developer wants to generate additional telemetry related to the blocking event action that was taken. Suppose a detection developer would like to generate additional detection telemetry along with the clouded detection event 20 (such as the Associate TreeID with Root output 172). However, there are many paths through the MIGO template pipeline 62 and not all will result in the Associate TreeID with Root output 172. For example, the pattern 162 in question may be configured as an indicator (resulting in an Associate Indicator event) or have an exclusion applied (resulting in a Detection Excluded event). In order to ensure that the additional telemetry only gets generated when the result was a proper detection (Associate TreeID with Root output 172), a detection developer can use the Detect and Respond process 176.

The endpoint detection agent 40 improves computer functioning. The endpoint detection agent 40 monitors the events 20 associated with the operating system 24 and/or with the software application 32. The user 50 may thus define templates 60 and tune the MIGO template pipeline 62 to detect event(s) 20 of interest. The events(s) 20 of interest, for example, may specify performance issues that are known to compromise (or suspected of compromising) hardware/software functioning of the computer system 22. The MIGO template pipeline 62 may thus detect the event(s) 20 that indicate performance issues, and the MIGO template pipeline 62 may nearly real-time immediately remediate the performance issues, as specified by the corresponding template 60. As another example, the templates 60 may specify evidence of cybersecurity threat or attack. Because the endpoint detection agent 40 detects the event(s) 20 that indicate the evidence of cybersecurity threat or attack, the endpoint detection agent 40 may immediately initiate or implement threat procedures. The endpoint detection agent 40, for example, may prevent the cybersecurity threat or attack from accessing the memory device 28 (e.g., RAM, ROM, disk). The endpoint detection agent 40 may also instruct the operating system 24 to halt or terminate an event 20, process 164, and/or behavior that is queued for execution. The endpoint detection agent 40 may thus reactively or proactively stop performance issues and cybersecurity threats.

The endpoint detection agent 40 further improves computer functioning. Because the endpoint detection agent 40 is dynamically configurable in near real time (for example, within seconds or a few minutes), the endpoint detection agents 40 in the field may be nearly immediately configured to detect a new pattern of events or features. Response times are exponentially reduced, thereby implementing nearly instantaneous detection of events 20. Performance issues, for example, may be easily and quickly detected and remediated. Cyber threats may also be nearly instantaneously specified, detected, and remediated. Indeed, runtime values and parameters may be adjusted for optimized detections. The MIGO template pipeline 62, used with a template 60, allows the endpoint detection agent 40 to be dynamically modified without a software upgrade and without requiring the computer system 22 to reboot or requiring the software application 32 to restart. A reboot, for example, involves some amount of risk to a customer's software application 32 and/or to the computer system 22. Customers are also hesitant to software upgrades. Indeed, some customers simply cannot reboot their computer machines for operational reasons. In some examples, the MIGO template pipeline 62 allows the endpoint detection agent 40 to be risk-free. New templates 60 may be safely pushed to the endpoint detection agents 40 operating in the customer's field for very quick responses. The endpoint detection agent 40 runs in the kernel-mode to improve the security of the computer system 22, and the endpoint detection agent 40 improves the ability of the computer system 22 to dynamically respond to new threats in the.

The endpoint detection agent 40 further improves computer functioning. The endpoint detection agent 40 monitors and detects the events 20 without a constant, active network connection. That is, once the endpoint detection agent 40 obtains the template 60, the endpoint detection agent 40 may monitor and protect the computer system 22 without requiring further network communications. The endpoint detection agent 40, in other words, provides the event detection service 42 independent of a constant, active network connection to the Internet or other network. The endpoint detection agent 40 only needs an intermittent or periodic (e.g., hourly, daily, or other timing) Internet connection to receive the template 60. Once the template 60 is obtained, the endpoint detection agent 40 may implement offline operation, locally monitor the events 20, and locally implement the template dispositions 68. Cloud-based services are greatly reduced, network bandwidth is greatly reduced, and network traffic is greatly reduced. The endpoint detection agent 40 may thus be a predominantly local event monitoring and detection service 42.

The endpoint detection agent 40 further improves computer functioning. Because the endpoint detection agent 40 need only perform operations for locally monitoring, generating, and comparing the templates 60, these operations may thus be represented using simple logical statements or code modules that consume little space (e.g., bits/bytes) in the memory device 28. These operations further require fewer hardware processor cycles and fewer input/output/read/write operations. These operations also consume reduced electrical power. The endpoint detection agent 40 is thus a compact, lightweight solution that is easily deployed to clients/customers in the field (such as the computer system 22). Indeed, because the endpoint detection agent 40 requires much less hardware and software resources, the endpoint detection agent 40 is an ideal solution for so-called Internet of Things devices having limited processor, memory, networking, and other resources.

The endpoint detection agent 40 may thus be a nimble and powerful endpoint detection mechanism. An endpoint device (such as the computer system 22) can be connected to the cloud computing environment 108 (illustrated in FIGS. 6-7). The endpoint device, however, may also include network-enabled printers, cameras, appliances, smart watches, health trackers, navigation systems, and other computer devices that can be connected to the Internet. Whatever the endpoint device, the endpoint device stores and executes the endpoint detection agent 40 to detect the event(s) 20 of interest using templates 60 and the MIGO template pipeline 62.

Endpoint inline detection is thus efficient and network independent. The computer system 22 (and thus the endpoint detection agent 40) need not have constant Internet access. The endpoint detection agent 40 provides fast, simple, and accurate offline monitoring of the events 20 for whatever purpose (such as performance improvement/remediation and cybersecurity protection). The endpoint detection agent 40 merely needs local access to the templates 60. The endpoint detection agent 40 only needs an occasional, intermittent, or periodic (e.g., hourly, daily, or other timing) Internet connection to receive the templates 60. The event detection service 42 may thus quickly detect suspicious events 20, process 164, or behavior within perhaps a few seconds. The event monitoring and detection service 42, in other words, is fast enough to hold an hardware/software operation without objectionable time/performance hang-ups or user notice. The event detection service 42 also need not query the cloud computing environment 108 nor send detected/suspicious data to the cloud computing environment 108. The endpoint detection agent 40 need merely be locally armed with the templates 60. The operating system 24 and the endpoint detection agent 40 interface to provide an offline, inline event detection service 42 that holds and analyzes suspicious hardware and software operations. Remote, slow, deadlocked network communications may be avoided without sacrificing the comprehensive event monitoring and detection service 42. The endpoint detection agent 40 thus empowers the computer system 22 to operate independently of cloud or other sources and to make informed decisions. The endpoint detection agent 40 may autonomously block an operation. The endpoint detection agent 40, however, may also autonomously query the cloud computing environment 108 for assistance (such as, for example, when the template 60 has a stale date or when the ontology 132 lacks a timely update).

The event detection service 42 thus provides a nimble and effective EDR solution. The endpoint detection agent 40 may be downloaded and installed to a server, switch, router, endpoint device, or other computer system 22. The endpoint detection agent 40 continuously monitors the computer system 22 to detect and to respond to the events 20 of interest. The endpoint detection agent 40 monitors for, detects, and blocks predefined or suspicious real time events 20, processes 164, and behaviors, based on the templates 60. The endpoint detection agent 40 monitors individual event behaviors, and sequences of the event behaviors, without the need for continuous Internet access and repeated cloud queries. The endpoint detection agent 40, for example, may detect evidence of a cybersecurity threat. The endpoint detection agent 40 may even be configured with an update timing parameter to periodically (e.g., hourly or daily) revive/establish an Internet connection for updates to the templates 60. The endpoint detection agent 40 is thus a predominantly offline and local endpoint detection and response (EDR) solution that need only intermittently, randomly, or periodically report to the cloud computing environment 108.

The endpoint detection agent 40 may also integrate with an XDR solution. Extended detection and response (XDR) collects data from siloed service tools across an organization's technology stack. The endpoint detection agent 40, when online, may upload event telemetry data from the host computer system 22 (e.g., servers, cloud workloads, and endpoint devices). The data uploaded from the endpoint detection agent 40 may then be unified/merged with other data collected from other platforms, perhaps filtered and condensed into a single console.

FIG. 48 illustrates examples of a method or operations executed by the endpoint detection agent 40 that detects the event(s) 20 of interest. The endpoint detection agent 40, installed on the endpoint computer system 22, receives notification of the event 20 associated with the operating system 24 (Block 200). The endpoint detection agent 40 compares the event 20 to the match rule 64 associated with the template 60 (Block 202). If the event 20 matches, equals, or otherwise satisfies the match rule 64 (Block 204), then the event routes to the MIGO template pipeline 62 for handling (Block 206) and the MIGO template pipeline 62 initiates execution of the template disposition 68 (Block 208). If, however, the event 20 fails to match, equal, or otherwise satisfy the match rule 64 (Block 204), then the endpoint detection agent 40 acquires another event 20 (Block 200) and repeats the comparison to the match rule 64 associated with the template 60 (Block 202).

Figure 49:
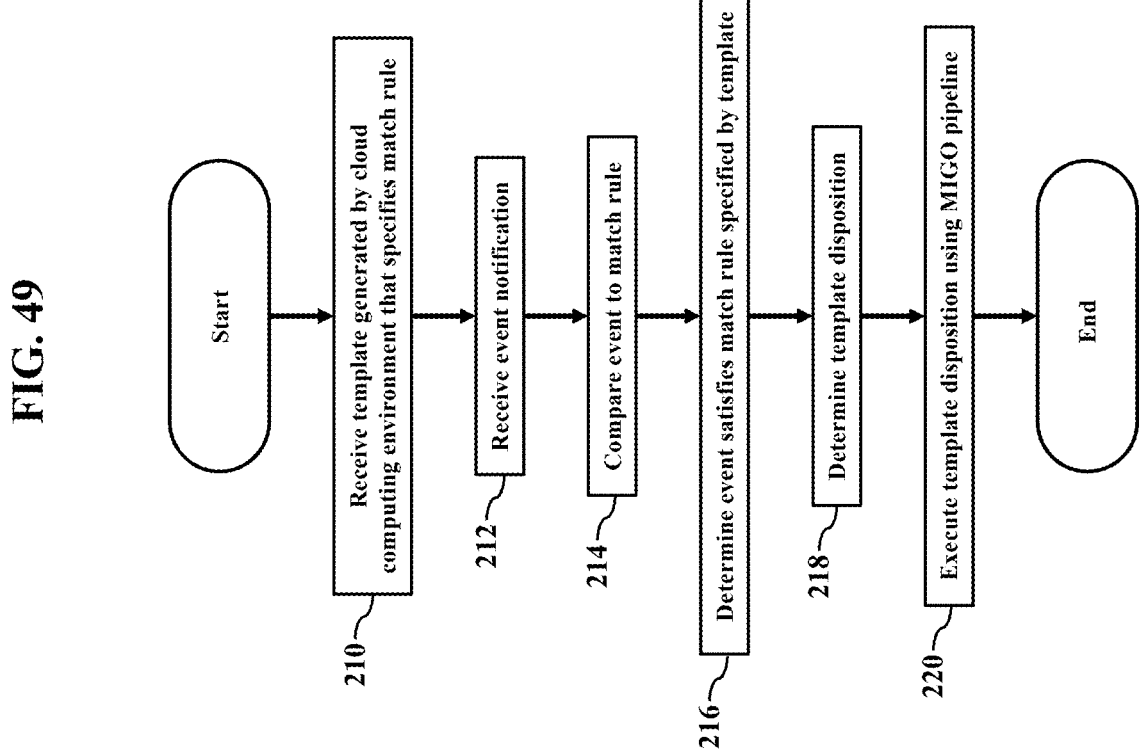
FIG. 49 illustrates more examples of a method or operations executed by the endpoint detection agent that detects the event(s) of interest.

FIG. 49 illustrates examples of more methods or operations executed by the endpoint detection agent 40 that detects the event(s) 20 of interest. The endpoint detection agent 40, installed on the endpoint computer system 22, receives the template 60 generated by the cloud computing environment 108 that specifies the match rule 64 associated with the event 20 (Block 210). The endpoint detection agent 40 receives the event notification associated with the operating system 24 (Block 212). The endpoint detection agent 40 compares the event 20, referenced by the event notification, to the template 60 (Block 214). The endpoint detection agent 40 determines that the event 20 satisfies the match rule 64 specified by the template 60 (Block 216). The endpoint detection agent 40 determines the template disposition 68 specified by the template 60 (Block 218) and executes the template disposition 68 using the MIGO template pipeline 62 (Block 220).

Figure 50:
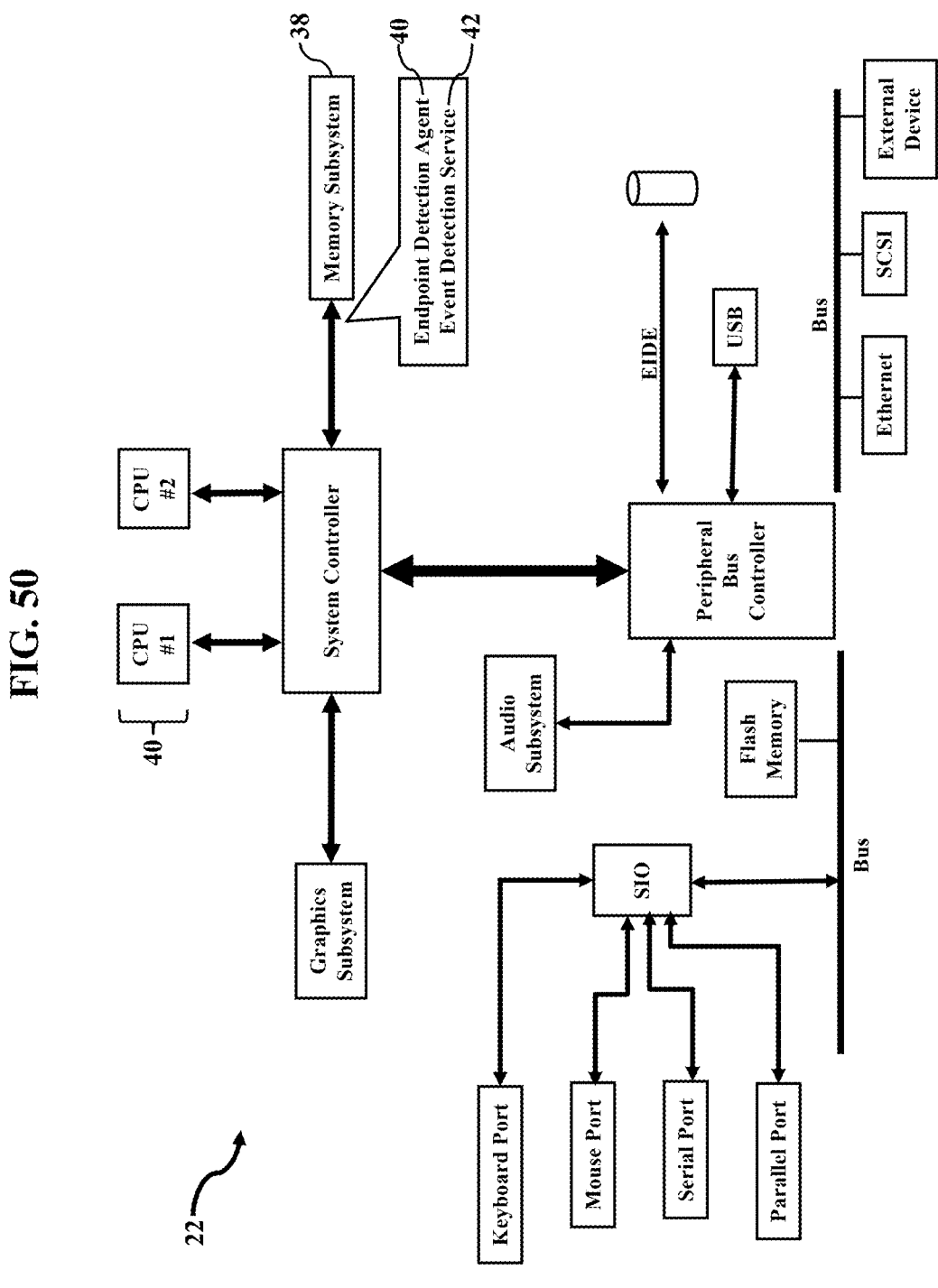
FIG. 50 illustrates a more detailed example of an operating environment.

FIG. 50 illustrates a more detailed example of the operating environment. FIG. 50 is a more detailed block diagram illustrating the computer system 22. The event detection agent 40 is stored in the memory subsystem or device 38.

One or more of the hardware processors 40 communicate with the memory subsystem or device 38 and execute the event detection agent 40. Examples of the memory subsystem or device 38 may include Dual In-Line Memory Modules (DIMMs), Dynamic Random Access Memory (DRAM) DIMMs, Static Random Access Memory (SRAM) DIMMs, non-volatile DIMMs (NV-DIMMs), storage class memory devices, Read-Only Memory (ROM) devices, compact disks, solid-state, and any other read/write memory technology.

The computer system 22 may have any embodiment. This disclosure mostly discusses the computer system 22 as the laptop computer 26 and the smartphone 102. The event detection agent 40 and the event detection service 42, however, may be easily adapted to stationary or mobile computing, wherein the computer system 22 may be a tablet computer, a smartwatch, and a network switch/router. The event detection agent 40 and the event detection service 42 may also be easily adapted to other embodiments of smart devices, such as a television, an audio device, a remote control, and a recorder. The event detection agent 40 and the event detection service 42 may also be easily adapted to still more smart appliances, such as washers, dryers, and refrigerators. Indeed, as cars, trucks, and other vehicles grow in electronic usage and in processing power, the event detection agent 40 and the event detection service 42 may be easily incorporated into a vehicular controller.

The above examples of the event detection agent 40 and the event detection service 42 may be applied regardless of the networking environment. The event detection agent 40 and the event detection service 42 may be easily adapted to stationary or mobile devices having wide-area networking (e.g., 4G/LTE/5G cellular), wireless local area networking (WI-FIR), near field, and/or BLUETOOTH® capability. The event detection agent 40 and the event detection service 42 may be applied to stationary or mobile devices utilizing a portion of the electromagnetic spectrum and a signaling standard (such as the IEEE 802 family of standards, GSM/CDMA/TDMA or other cellular standard, and/or the ISM band). The event detection agent 40 and the event detection service 42, however, may be applied to a processor-controlled device operating in the radio-frequency domain and/or the Internet Protocol (IP) domain. The event detection agent 40 and the event detection service 42 may be applied to a processor-controlled device utilizing a distributed computing network, such as the Internet (sometimes alternatively known as the "World Wide Web"), an intranet, a local-area network (LAN), and/or a wide-area network (WAN). The event detection agent 40 and the event detection service 42 may be applied to a processor-controlled device utilizing power line technologies, in which signals are communicated via electrical wiring. Indeed, the many examples may be applied regardless of physical componentry, physical configuration, or communications standard(s).

The computer system 22 may utilize a processing component, configuration, or system. For example, the event detection agent 40 and the event detection service 42 may be easily adapted to a desktop, mobile, or server central processing unit or chipset offered by INTEL®, ADVANCED MICRO DEVICES®, ARM®, APPLE®, TAIWAN SEMICONDUCTOR MANUFACTURING®, QUALCOMM®, or other manufacturer. The computer system 22 may even use multiple central processing units or chipsets, which could include distributed processors or parallel processors in a single machine or multiple machines. The central processing unit or chipset can be used in supporting a virtual processing environment. The central processing unit or chipset could include a state machine or logic controller. When one or more of the central processing units or chipsets execute instructions to perform "operations," this could include the central processing unit or chipset performing the operations directly and/or facilitating, directing, or cooperating with another device or component to perform the operations.

The event detection agent 40 and the event detection service 42 may use packetized communications. When the computer system 22 communicates via the access network 106 and/or the cloud computing environment 108, information may be collected, sent, and retrieved. The information may be formatted or generated as packets of data according to a packet protocol (such as the Internet Protocol). The packets of data contain bits or bytes of data describing the contents, or payload, of a message. A header of each packet of data may be read or inspected and contain routing information identifying an origination address and/or a destination address.

The event detection agent 40 and the event detection service 42 may utilize a signaling standard. The computer system 22, the access network 106, and/or the cloud computing environment 108 may mostly use wired networks to interconnect network members. However, the computer system 22, the access network 106, and/or the cloud computing environment 108 may utilize a communications device using the Global System for Mobile (GSM) communications signaling standard, the Time Division Multiple Access (TDMA) signaling standard, the Code Division Multiple Access (CDMA) signaling standard, the "dual-mode" GSM-ANSI Interoperability Team (GAIT) signaling standard, or a variant of the GSM/CDMA/TDMA signaling standard. The cloud-based malware assessment service 40 may also utilize other standards, such as the I.E.E.E. 802 family of standards, the Industrial, Scientific, and Medical band of the electromagnetic spectrum, BLUETOOTH®, low-power or near-field, and other standard or value.

The event detection agent 40 and the event detection service 42 may be physically embodied on or in a computer-readable storage medium. This computer-readable medium, for example, may include CD-ROM, DVD, tape, cassette, floppy disk, optical disk, USB flash memory drive, memory card, memory drive, and large-capacity disks. This computer-readable medium, or media, could be distributed to end-subscribers, licensees, and assignees. A computer program product comprises processor-executable instructions for providing the event detection agent 40 and the event detection service 42, as the above paragraphs explain.

The diagrams, schematics, illustrations, and the like represent conceptual views or processes illustrating examples of cloud services malware detection. The functions of the various elements shown in the figures may be provided through the use of dedicated hardware as well as hardware capable of executing instructions. The hardware, processes, methods, and/or operating systems described herein are for illustrative purposes and, thus, are not intended to be limited to a particular named manufacturer or service provider.

As used herein, the singular forms "a," "an," and "the" are intended to include the plural forms as well, unless expressly stated otherwise. It will be further understood that the terms "includes," "comprises," "including," and/or "comprising," when used in this Specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, and so on, may be used herein to describe various elements, these elements should not be limited by these terms. These terms are only used to distinguish one element from another. For example, a first computer or container could be termed a second computer or container and, similarly, a second device could be termed a first device without departing from the teachings of the disclosure.

The invention claimed is:

1. A method executed by an endpoint detection agent, comprising:

receiving, by the endpoint detection agent, an event detected by a host operating system;

in response to the event satisfying a match rule associated with a template, routing, by the endpoint detection agent, the event to Multi-Instance Generic Operation pipeline componentry configured to process the event; and initiating, by the Multi-Instance Operation pipeline componentry, a template disposition specified by the template in response to the event detected by the host operating system.

2. The method of claim 1, further comprising matching a context associated with the event-to the match rule associated with the template.

3. The method of claim 1, further comprising generating, by the Multi-Instance Generic Operation pipeline componentry, an output in response to the event satisfying the match rule associated with the template.

4. The method of claim 1, further comprising determining, by the Multi-Instance Generic Operation pipeline componentry, no action in response to the template disposition.

5. The method of claim 1, further comprising determining, by the endpoint detection agent, an event remediation specified by the template.

6. The method of claim 1, further comprising blocking, by the endpoint detection agent, a kernel process associated with the event.

7. The method of claim 1, further comprising designating, by the endpoint detection agent, the event for an exclusion according to the template.

8. An endpoint computer system, comprising:

a central processing unit; and a memory device storing instructions that, when executed by the central processing unit, perform operations, the operations comprising:

receiving, by an endpoint detection agent installed on the endpoint computer system, a template that specifies a match rule associated with an event;

receiving, by the endpoint detection agent installed on the endpoint computer system, an event notification from an operating system detecting the event;

in response to the event satisfying the match rule specified by the template, determining, by Multi-Instance Generic Operation pipeline componentry associated with the endpoint detection agent installed on the endpoint computer system, a template disposition specified by the template; and executing, by the endpoint detection agent installed on the endpoint computer system, the template disposition specified by the template.

9. The endpoint device of claim 8, wherein the operations further comprise routing the event to the Multi-Instance Generic Operation pipeline componentry associated with the endpoint detection agent.

10. The endpoint device of claim 8, wherein the operations further comprise notifying, by the endpoint detection agent installed on the endpoint computer system, a cloud computing environment of the template disposition determined by the Multi-Instance Generic Operation pipeline componentry.

11. The endpoint device of claim 8, wherein the operations further comprise terminating, by the Multi-Instance Generic Operation pipeline componentry, a kernel process associated with the event.

12. The endpoint device of claim 8, wherein the operations further comprise determining, by the Multi-Instance Generic Operation pipeline componentry, an event remediation specified by the template.

13. The endpoint device of claim 8, wherein the operations further comprise blocking, by the Multi-Instance Generic Operation pipeline componentry, a kernel process associated with the event.

14. The endpoint device of claim 8, wherein the operations further comprise excluding, by the Multi-Instance Generic Operation pipeline componentry, the event according to the template.

15. A memory device storing instructions that, when executed by a central processing unit, perform operations, comprising:

receiving, by an endpoint detection agent installed on an endpoint computer system, a template generated by a cloud computing environment that specifies a non-textual match rule associated with the event;

receiving, by the endpoint detection agent installed on the endpoint computer system, an event notification from a host operating system detecting notifying of the event;

in response to the event satisfying the non-textual match rule specified by the template, determining, by the Multi-Instance Generic Operation pipeline componentry, a template disposition specified by the template; and executing, by the endpoint detection agent installed on the endpoint computer system, the template disposition specified by the template.

16. The memory device of claim 15, wherein the operations further comprise routing the event to the Multi-Instance Generic Operation pipeline componentry.

17. The memory device of claim 15, wherein the operations further comprise notifying, by the endpoint detection agent installed on the endpoint computer system, a cloud computing environment of the event that satisfies the match rule specified by the template.

18. The memory device of claim 15, wherein the operations further comprise identifying, by the endpoint detection agent installed on the endpoint computer system, a behavior associated with the event.

19. The memory device of claim 15, wherein the operations further comprise determining, by the endpoint detection agent installed on the endpoint computer system, an event remediation specified by the template.

20. The memory device of claim 15, wherein the operations further comprise blocking, by the endpoint detection agent installed on the endpoint computer system, a kernel process associated with the event.

* * * * *